United States Patent
Wiggs

(10) Patent No.: US 12,488,372 B2
(45) Date of Patent: *Dec. 2, 2025

(54) INDEPENDENTLY PROCURABLE ITEM COMPLIANCE INFORMATION

(71) Applicant: Avalara, Inc., Seattle, WA (US)

(72) Inventor: Jonathan L Wiggs, Seattle, WA (US)

(73) Assignee: Avalara, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/206,538

(22) Filed: Jun. 6, 2023

(65) Prior Publication Data

US 2023/0316367 A1   Oct. 5, 2023

Related U.S. Application Data

(63) Continuation of application No. 17/217,843, filed on Mar. 30, 2021, now Pat. No. 11,710,165.

(Continued)

(51) Int. Cl.
*G06Q 30/0601* (2023.01)
*G06F 18/214* (2023.01)
(Continued)

(52) U.S. Cl.
CPC ....... *G06Q 30/0623* (2013.01); *G06F 18/214* (2023.01); *G06K 7/10297* (2013.01);
(Continued)

(58) Field of Classification Search
CPC ............. G06Q 30/0623; G06Q 10/087; G06Q 20/201; G06Q 20/208; G06Q 30/0631;
G06Q 30/0639; G06Q 20/207; G06N 20/00; G06V 20/00; G06F 18/214; G06T 11/00; H04L 67/12; G06K 7/10297; G06K 7/10861; G06K 7/1413

See application file for complete search history.

(56) References Cited

U.S. PATENT DOCUMENTS

| 7,783,536 B2 | 8/2010 | William et al. |
| 7,933,803 B1 | 4/2011 | Nadler et al. |

(Continued)

FOREIGN PATENT DOCUMENTS

| CN | 110008358 A | 7/2019 |
| WO | 2016/210354 A1 | 12/2016 |
| WO | 2019/119056 A1 | 6/2019 |

OTHER PUBLICATIONS

Office Action received for Chinese Patent Application No. 202180049870.6, mailed on Mar. 1, 2024, 13 pages (6 pages of English Translation and 7 pages of Original Document).

(Continued)

*Primary Examiner* — Olusegun Goyea
(74) *Attorney, Agent, or Firm* — Jeremiah J. Baunach; Frontier IP Law PLLC

(57) ABSTRACT

Systems and methods electronically provide information regarding digital rules related to a potential relationship instance. Users often wish to know which digital rules apply to a specified item before engaging in a relationship instance with a host entity regarding the item. The system and methods described herein allow a computing facility to identify an item and receive resource information related to the item and the digital rules applicable to the item.

24 Claims, 12 Drawing Sheets

Related U.S. Application Data

(60) Provisional application No. 63/055,830, filed on Jul. 23, 2020.

(51) Int. Cl.
| | | |
|---|---|---|
| *G06K 7/10* | (2006.01) | |
| *G06N 20/00* | (2019.01) | |
| *G06Q 10/087* | (2023.01) | |
| *G06Q 20/20* | (2012.01) | |
| *G06T 11/00* | (2006.01) | |
| *G06V 20/00* | (2022.01) | |
| *G06K 7/14* | (2006.01) | |
| *H04L 67/12* | (2022.01) | |

(52) U.S. Cl.
CPC .......... *G06K 7/10861* (2013.01); *G06N 20/00* (2019.01); *G06Q 10/087* (2013.01); *G06Q 20/201* (2013.01); *G06Q 20/208* (2013.01); *G06Q 30/0631* (2013.01); *G06Q 30/0639* (2013.01); *G06T 11/00* (2013.01); *G06V 20/00* (2022.01); *G06K 7/1413* (2013.01); *G06Q 20/207* (2013.01); *H04L 67/12* (2013.01)

(56) References Cited

U.S. PATENT DOCUMENTS

| | | |
|---|---|---|
| 8,620,578 B1 | 12/2013 | Brown et al. |
| 8,725,407 B2 | 5/2014 | Hurley et al. |
| 9,760,915 B2 | 9/2017 | Pavlou et al. |
| 10,445,818 B1 | 10/2019 | Chowdhary |
| 10,769,611 B2 | 9/2020 | Mcneel |
| 11,710,165 B2 * | 7/2023 | Wiggs ............... G06V 20/00 705/20 |
| 2002/0138765 A1 | 9/2002 | Fishman et al. |
| 2007/0136158 A1 | 6/2007 | Rawlings et al. |
| 2007/0136159 A1 | 6/2007 | Rawlings et al. |
| 2013/0013471 A1 | 1/2013 | Fishman |
| 2015/0066695 A1 | 3/2015 | Delingat et al. |
| 2017/0039613 A1 | 2/2017 | Kaehler et al. |
| 2017/0161717 A1 | 6/2017 | Xing et al. |
| 2018/0150892 A1 * | 5/2018 | Waldron ............ G06Q 30/0631 |
| 2019/0244436 A1 * | 8/2019 | Stansell ............ G06Q 30/0643 |
| 2020/0286135 A1 * | 9/2020 | Matayoshi ............ G09F 3/204 |
| 2020/0380591 A1 * | 12/2020 | Rule .................. G06Q 20/3829 |

OTHER PUBLICATIONS

International Preliminary Report on Patentability received for PCT Patent Application No. PCT/US21/042831, mailed on Feb. 2, 2023, 11 pages.

International Search Report and Written Opinion received for PCT Patent Application No. PCT/US21/042831, mailed on Nov. 3, 2021, 13 pages.

Office Action received for Saudi Arabian Patent Application No. 523442299, mailed on Mar. 22, 2024, 6 pages of English translation only.

* cited by examiner

INDEPENDENTLY PROCURABLE ITEM COMPLIANCE INFORMATION

TECHNICAL FIELD

The technical field relates to computer networks, and particularly to networked automated systems for producing resources based on digital rules.

BRIEF SUMMARY

The present description gives instances of computer systems, storage media that may store programs, and methods. Embodiments of the system may use a user device to generate sensed item data used to identify an item and to retrieve and display resource information regarding a possible relationship instance (or a "potential relationship instance") based on the identified item. By displaying resource information regarding a possible relationship instance on a user device, a user is able to view the resource information without having to engage in the possible relationship instance.

In addition, the user is able to identify information regarding the item's compliance with certain digital rules, such as information regarding which digital rules apply to the item and what effect those rules have. In various embodiments, the system may compare the digital rules, their effects, etc., to a list of resource use priorities defined by the user. This allows the system to inform the user about the item and the effects of the digital rules, as well as to suggest other items which may better conform to the resource use priorities. Additionally, the system allows the user to obtain data regarding the effects of the digital rules without the relationship instance actually occurring, thus reducing the number of relationship instances which are cancelled due to effects of the digital rules which were unknown before the relationship instance began. By lowering the rate of cancelled relationship instances, the system is able to reduce the amount of resources used to process and cancel ongoing relationship instances.

Therefore, the systems and methods described herein for generating item sensed data to identify an item and retrieve and display resource information regarding a possible relationship instance involving the item improves the functioning of computer or other hardware, such as by reducing the processing, storage, and/or data transmission resources needed to perform various tasks, thereby enabling the tasks to be performed by less capable, capacious, and/or expensive hardware devices, enabling the tasks to be performed with less latency and/or preserving more of the conserved resources for use in performing other tasks or additional instances of the same task.

As shown above and in more detail throughout the present disclosure, the present disclosure provides technical improvements in computer networks to existing computerized systems to provide resources related to proposed relationship instances.

These and other features and advantages of the claimed invention will become more readily apparent in view of the embodiments described and illustrated in this specification, namely in this written specification and the associated drawings.

DETAILED DESCRIPTION

As has been mentioned, the present description is about computer systems, storage media that may store programs, and methods. Embodiments are now described in more detail.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, that embodiments of the inventive subject matter may be practiced without these specific details. In general, well-known structures and methods associated with underlying technology have not been shown or described in detail to avoid unnecessarily obscuring descriptions of the preferred embodiments.

Figure 1:
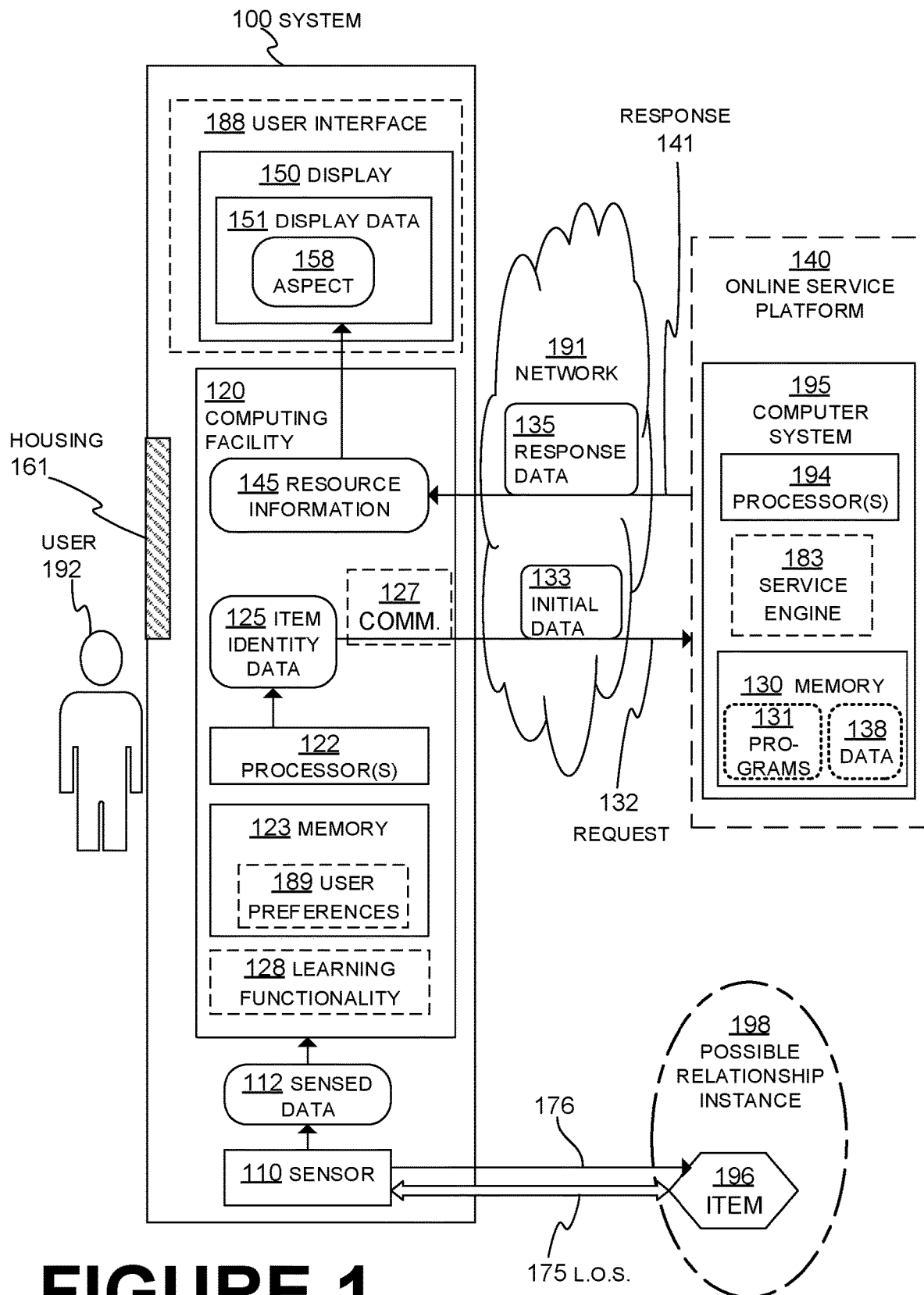
FIG. 1 is a diagram showing sample aspects of embodiments of the present disclosure involving obtaining item sensed data from an item and retrieving resource information based on an item identified by using the item sensed data, which is an improvement in automated computer systems.

FIG. 1 is a diagram showing sample aspects of embodiments of the present disclosure involving obtaining item sensed data 112 from an item and retrieving resource information 145 based on an item 196 identified by using the item sensed data 112, which is an improvement in automated computer systems.

Included in FIG. 1, a sample computer system 195 according to embodiments is shown. The computer system 195 has one or more processors 194 and a memory 130. The memory 130 stores programs 131 and data 138. The one or more processors 194 and the memory 130 of the computer system 195, thus, implement a service engine 183. Additional implementation details for the computer system 195 are given later in this document.

The computer system 195 can be located in "the cloud." In fact, the computer system 195 may optionally be implemented as part of an online software platform (OSP) 140. The OSP 140 can be configured to perform one or more predefined services, for example via operations of the service engine 183. Such services can be searches, determinations, computations, verifications, notifications, the transmission of specialized information, including data that effectuates payments, the generation and transmission of documents, the online accessing other systems to effect registrations, and so on, including what is described in this document. Such services can be provided as a Software as a Service (SaaS).

A user 192 may use a system 100 which includes a computing facility 120 that interfaces with a display 150, on which User Interfaces (UIs) and display data 151 may be shown. Display 150 can be part of a broader User Interface (UI) 188. The UI 188 can have actuators like buttons, etc., and via which the system 100 can receive inputs from the user 192. These inputs can include user preferences 189, which can be stored in the memory 123. The user preferences 189 can be used by the user 192 to quickly select their preferred items or information to retrieve or view.

The system 100 may additionally include a sensor 110. In embodiments, the system 100 is contained within a housing 161. Additional sample implementation details for the computing facility 120 are given later in this document. In some embodiments, the user 192 is within a physical site of the host entity, or even an agent of a host entity, although that is not necessary. In embodiments, the computing facility 120 or other device of the user 192 are client devices for the computer system 195. The computing facility 120 includes one or more processors 122 and a memory 123. The one or more processors 122 and the memory 123 may be used by the computing facility 120 to store and execute programs and data for implementing the functions of the computing facility 120 or system 100.

The computing facility 120 may access the computer system 195 via a communications network 191, such as the Internet. In embodiments, the computing facility 120 may utilize a communication module 127 for communicating via the communications network 191. In particular, the entities and associated systems of FIG. 1 may communicate via physical and logical channels of the communication network 191. For example, information may be communicated as data using the Internet Protocol (IP) suite over a packet-switched network such as the Internet or other packet-switched network, which may be included as part of the communication network 191. The communication network 191 may include many different types of computer networks and communication media including those utilized by various different physical and logical channels of communication, now known or later developed. Non-limiting media and communication channel examples include one or more, or any operable combination of: fiber optic systems, satellite systems, cable systems, microwave systems, asynchronous transfer mode (ATM) systems, frame relay systems, digital subscriber line (DSL) systems, radio frequency (RF) systems, telephone systems, cellular systems, other wireless systems, and the Internet. In various embodiments the communication network 191 can be or include any type of network, such as a local area network (LAN), a metropolitan area network (MAN), a wide area network (WAN), or the Internet.

Downloading or uploading may be permitted from one of these two computer systems to the other, and so on. Such accessing can be performed, for instance, with manually uploading files, like spreadsheet files, etc. Such accessing can also be performed automatically as shown in the example of FIG. 1. The computing facility 120 and the computer system 195 may exchange requests and responses with each other. Such can be implemented with a number of architectures.

In one such architecture, a device remote to the service engine 183, such as computing facility 120, may have a certain application (not shown) and a connector (not shown) that is a plugin that sits on top of that certain application. The connector may be able to fetch from the remote device the details required for the service desired from the OSP 140, form an object or initial data 133, and then send or push a request 132 that carries the initial data 133 to the service engine 183 via a service call. The service engine 183 may receive the request 132 with the initial data 133. The service engine 183 may then apply digital rules to the initial data 133 to determine resource information 145 and form a response data 135 containing the resource information 145, and then push, send, or otherwise cause to be transmitted a response 141 that carries the response data 135 to the connector. The connector reads the response 141, and forwards the response data 135 to the certain application.

In an alternative such architecture, a device remote to the service engine 183, such as computing facility 120, may have a particular application (not shown). In addition, the computer system 195 implements a REST (Representational State Transfer) API (Application Programming Interface) (not shown). REST or RESTful API design is designed to take advantage of existing protocols. While REST can be used over nearly any protocol, it usually takes advantage of HTTP (Hyper Text Transfer Protocol) when used for Web APIs. This alternative architecture enables the system 100 to directly consume a REST API from their particular application, without using a connector. The particular application of the remote device may be able to fetch internally from the remote device the details required for the service desired from the OSP 140, and thus send or push the request 132 to the REST API. In turn, the REST API talks in the background to the service engine 183. Again, the service engine 183 generates the response data 135, and sends an aspect of it back to the REST API. In turn, the REST API sends the response 141 that has the response data 135 to the particular application.

In some instances, the user 192 or the system 100 may have possible relationship instances 198 involving an item 196. Only one such item 196 is shown. In this example, the system 100 has a possible relationship instance 198 involving the item 196.

In some instances, the item 196 is within the line of sight 175 of the system 100, or a sensor 110 used by the system 100. The sensor 110 may sense the item 196, as indicated by the arrow 176. The sensor 110 may then produce sensed data 112, which is provided to the computing facility 120. In various embodiments, the sensor 110 includes one or more of an RFID reader, a camera, an optical sensor, a machine readable code sensor, etc. In embodiments, the housing 161 includes a trigger, switch, button, etc., which may be used to activate the sensor 110.

The sensed data 112 may be used by the computing facility 120 to produce item identity data 125, such as by generating an image of an item 196; interpret a machine readable code of an item 196, such as a Universal Product Code (UPC), Amazon Standard Identification Number (ASIN), an International Article Number, also known as European Article Number or EAN that is a standard describing a barcode symbology and numbering system used in global trade to identify a specific retail product type, etc.; identify a base value of the item 196; etc., which may be further used to generate the item identity data 125. In embodiments, the sensed data 112 may be used to obtain a base value of an item 196. In embodiments, the item identity data 125 may be used to obtain a base value of an item 196. The base value of the item 196 may be obtained by looking up the base value of the item in a list of base values, which may be obtained from the computing facility 120, the OSP 140, a system of host premises, etc.

In some instances, the user 192 or the system 100 may have data about one or more secondary entities, for example, via relationship instances with them. The system 100 and/or the secondary entities may be referred to as simply entities. One of these entities may have one or more attributes. Such an attribute of such an entity may be any one of its name, type of entity, a physical or geographical location such as an address, a contact information element, an affiliation, a characterization of another entity, a characterization by another entity, an association or relationship with another entity (general or specific instances), an asset of the entity, a declaration by or on behalf of the entity, and so on.

In some embodiments, one or more requests may be received by the computer system 195 via a network. In this example, a request 132 is received by the computer system 195 via the network 191. The request 132 has been transmitted by the remote computing facility 120. The received one or more requests can carry payloads. In this example, the request 132 carries initial data 133. In such embodiments, the one or more payloads may be parsed by the computer system 195 to extract data, such as item identity data 125. In this example, the initial data 133 can be parsed by the computer system 195 to extract the item identity data 125. In this example, the single initial data 133 encodes the entire item identity data 125, but that is not required. In fact, a dataset can be received from the payloads of multiple requests. In such cases, a single payload may encode only a portion of the dataset. And, of course, the payload of a single request may encode multiple datasets. Additional computers may be involved with the network 191, some beyond the control of the user 192 or OSP 140, and some within such control.

The item identity data 125 has values that can be numerical, alphanumeric, Boolean, and so on, as needed for what the values characterize. For example, an identity value ID may indicate an identity of the item 196, so as to differentiate it from other such items.

In embodiments, stored digital rules may be accessed by the computer system 195. These rules are digital in that they are implemented for use by software. The stored digital rules are further described in relation to FIG. 14.

In embodiments, the computing facility 120 may include a Learning Functionality 128. The Learning Functionality 128 may be implemented in a number of ways, for example by artificial intelligence (A.I.), by machine learning (ML), and so on. Accordingly, the Learning Functionality 128 may be used by the computing facility to generate the item identity data 125 from the item sensed data 112.

The computing facility 120 may process the resource information 145 to generate display data 151 that is displayed by using the display 150. The display data 151 may include an aspect 158, which may include information related to the item 196, an image of the item 196, the obtained resource information 145, etc. In embodiments, the aspect 158 includes an image of the item 196 with the resource information 145 superimposed on the image. In embodiments, the display 150 is used to provide augmented reality where the aspect 158 is superimposed over the item 196. Such superimposing may be, for instance, a preferred viewing, according to the user preferences 189. The system may retrieve stored user preferences 189, and superimpose accordingly.

Figure 2:
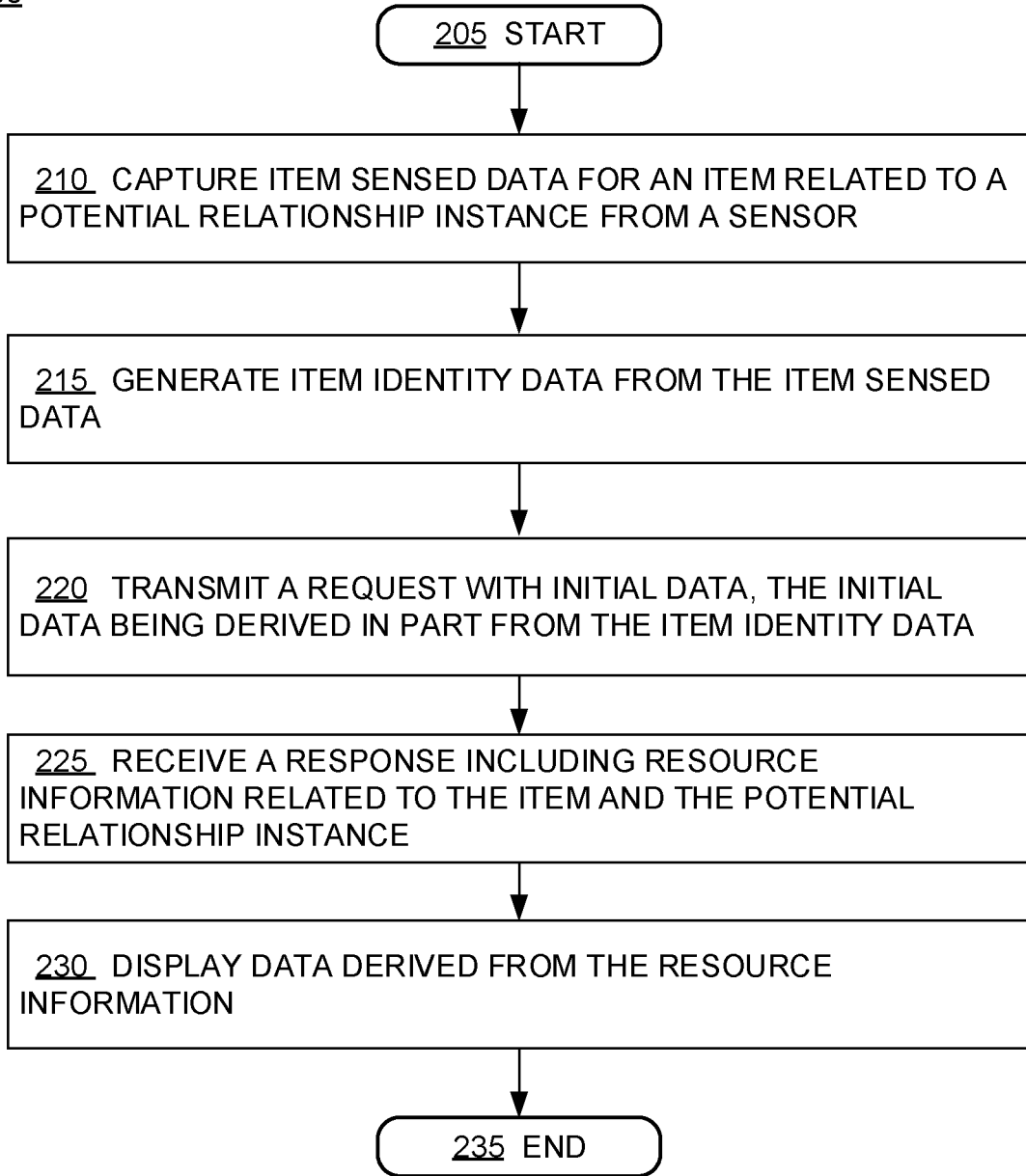
FIG. 2 is a flowchart for illustrating a sample method for generating item identity data and displaying resource information related to an item identified by the item identity data, according to embodiments of the present disclosure.

FIG. 2 is a flowchart for illustrating a sample method for generating item identity data and displaying resource information related to an item identified by the item identity data, according to embodiments of the present disclosure.

Although, in the present example, the operations and methods described with reference to the flowcharts illustrated in FIGS. 2 and 15-17 are described as being performed by the system 100, in various embodiments, one or more of the operations and methods described with reference to the flowcharts illustrated in FIGS. 2 and 15-17 may be performed by the OSP 140.

The method 200 starts at 205.

At 210, the system 100 captures item sensed data 112 for an item 196 related to a possible relationship instance 198 between a user 192 and a host entity from a sensor 110.

At 215, the system 100 generates item identity data 125 for the item 196 based on the item sensed data 112.

At 220, the system 100 derives initial data 133 from the item identity data 125 and transmits a request 132 to an OSP 140 which contains the initial data.

At 225, the system 100 receives a response 141 from the OSP 140 which includes resource information 145 related to the item 196 and the possible relationship instance 198.

At 230, the system 100 displays data derived from the resource information 145 by using the display 150.

The method ends at 235.

The system 100 described with respect to FIG. 1 may be used to sense an item capable of being a part of a potential relationship instance, and to generate item sensed data from the item. The system 100 may generate item identity data that identifies the item from the item sensed data. The system 100 may derive initial data, at least in part, from the item identity data and transmit the item initial data across a network within a request. The system 100 may receive, across the network and in response to the request, a response based on the initial data which includes resource information about the potential relationship instance. In response to receiving the resource information, the system 100 may derive display data from the resource information, and display the display data and indicate an aspect of the potential relationship instance.

In embodiments, the system 100 is a personal computing device configured to be carried by the person. The system 100 may be a smartphone, a tablet, a personal computing device, and so on.

In embodiments, the system 100 includes a housing 161. The display 151 may be attached to the housing 161. The sensor 110 may be attached to the housing 161.

In embodiments, the system 100 includes a trigger. A user 192 may manually actuate the trigger. The actuation of the trigger may cause the sensor to generate the item sensed data 112.

In embodiments, the sensor 110 is a part of an RFID reader. The sensed data 112 may be RFID data. In some embodiments, the sensor 110 is a part of a machine readable-optical code scanner. The sensed data 112 may be machine-readable-optical code data. In some embodiments, the sensor 110 is a part of a camera. The sensed data 112 may be image data.

In embodiments, the display data 151 includes an image of at least a portion of the item 196 that is made from the image data. In some embodiments, the image data does not include a machine readable-optical code. The item identity data 125 may be generated, at least in part, by using a Learning Functionality, such as the Learning Functionality 128 described above, to identify the item 196 based on the image data.

In embodiments, the aspect 158 may be superimposed on the image of at least a portion of the item 196. The superimposition may be performed via augmented reality.

In embodiments, the system 100 includes a pair of glasses configured to be worn by the user 192. The display 150 may be a heads-up display displayed on the glasses.

In embodiments, the item identity data is generated via identifying a product code within the generated item sensed data 112.

In embodiments, the initial data 133 includes the item identity data 125.

In embodiments, the sensor 110 is caused to generate the item sensed data 112.

In embodiments, the system 100 obtains information regarding an entity offering the item. The initial data 133 may include the information regarding the entity offering the item.

In embodiments, the system 100 obtains location data. The location data may be associated with one or more of: the system 100, the item 196, and an entity having the item. The location data may identify a current geographic location associated with one or more of: the system 100, the item 196, and the entity having the item. The system may include the location data in the initial data 133. The resource information may be produced based on digital rules obtained from a digital rules database queried by using item query data and the location data, where the item query data is produced by an item query database based on the item identity data.

In embodiments, the resource information is produced by applying digital rules to the possible relationship instance 198 based on the item identity data 125 and location data. The location data may indicate a current location of the system. The resource information may include a percentage rate.

In embodiments, the resource information includes data describing a resource amount to be remitted to a domain as a result of the possible relationship instance 198, the resource amount being associated with the potential relationship instance involving the item. In embodiments, the resource information 145 includes data describing how at least a portion of the resource amount is to be used by the domain.

In embodiments, the system 100 obtains input identifying one or more resource use priorities. The system 100 may determine whether a resource amount is to be used for at least one of the resource use priorities based on the data describing how at least a portion of the resource amount is to be used by the domain. The system 100 may display that the resource amount is to be used for at least one of the resource use priorities on the display 150 based on a determination that at least a portion of the resource amount is to be used for at least one of the one or more resource use priorities.

In embodiments, the system 100 identifies a second item which is determined to be similar to the item 196 based on the item identity data 125. The system 100 may display additional resource information associated with another potential relationship instance involving the second item. The additional resource information may include another resource amount associated with the other potential relationship instance. The system 100 may determine whether the other resource amount is less than, greater than, equal to, etc., the resource amount of the item 196. The system 100 may use the display 150 to display that the second resource amount is less than, equal to, greater than, etc., the resource amount of the item 196.

In embodiments, the item identity data 125 is generated via identifying a product code within the generated item sensed data 112. The system 100 may look up, from the product code, a base value. The request 132 may include the base value.

In embodiments, system 100 stores a list of product codes and base values. The system 100 may access another computing device, computing system, etc., to obtain at least a portion of the list of product codes and base values. The base value of the item 196 may be looked up from the list.

In embodiments, the system 100 communicates, along a communication link, the product code to a system of host premises. The system 100 may receive the base value of the item 196 as a response from the system of host premises.

In embodiments, the system 100 generates an image of at least a portion of the item 196 based on the item sensed data 112. The item identity data 125 may be generated based on identifying the item in the image. The item in the image may be identified by using one or more of: object recognition performed by image processing of the image, reading an item identification code present in the image, recognizing text in the image indicating a name or brand of the item, recognizing a trademark in the image, etc. The image may be an image of a screen displaying an image of at least a portion of the item.

In embodiments, the system 100 may obtain information describing a resource amount exemption certificate related to the item 196. The information describing the resource exemption certificate may be obtained based on at least one of the system of claim QAS8, in which the operations further include: the item identity data, the resource information, information regarding a potential recipient of the item, and information regarding an entity offering the item, etc. The system 100 may display information describing the resource exemption certificate on the display 150.

Figure 3:
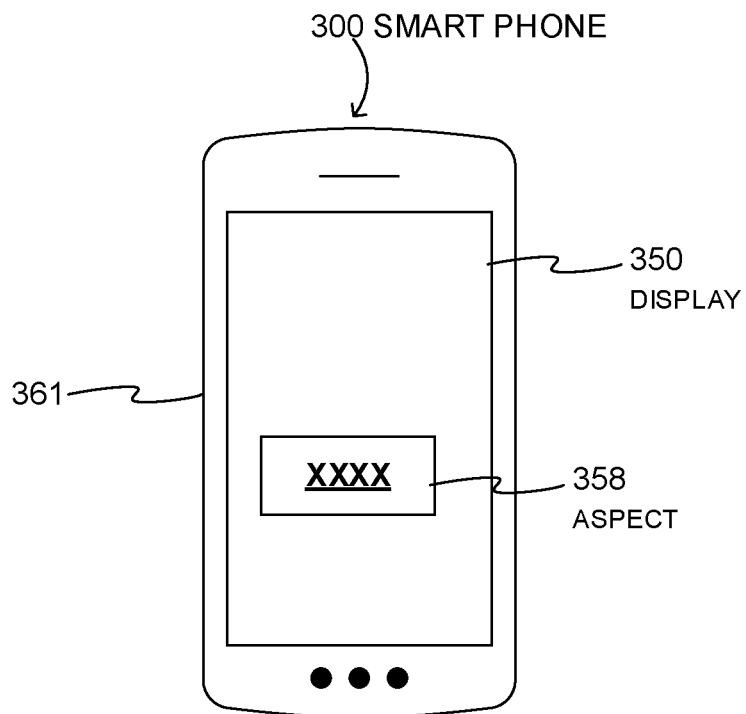
FIG. 3 is a diagram showing sample aspects of embodiments of the present disclosure involving a smartphone which may be used by a user, according to embodiments of the present disclosure.

FIG. 3 is a diagram showing sample aspects of embodiments of the present disclosure involving a smartphone which may be used by a user, according to embodiments of the present disclosure.

The smart phone 300 depicted in FIG. 3 is an example of a system that may implement all or a portion of the system 100. During operation, the smart phone 300 may perform all or a portion of the operations performed by the system 100. The smart phone 300 includes a display 350 and a housing 361. The display 350 may display an aspect 358 which includes resource information 145 related to the item 196. The aspect 358 may be superimposed over another image, such as an image of an item 196. Additionally, the smart phone 300 may use augmented-reality to display the aspect 358.

Figure 4:
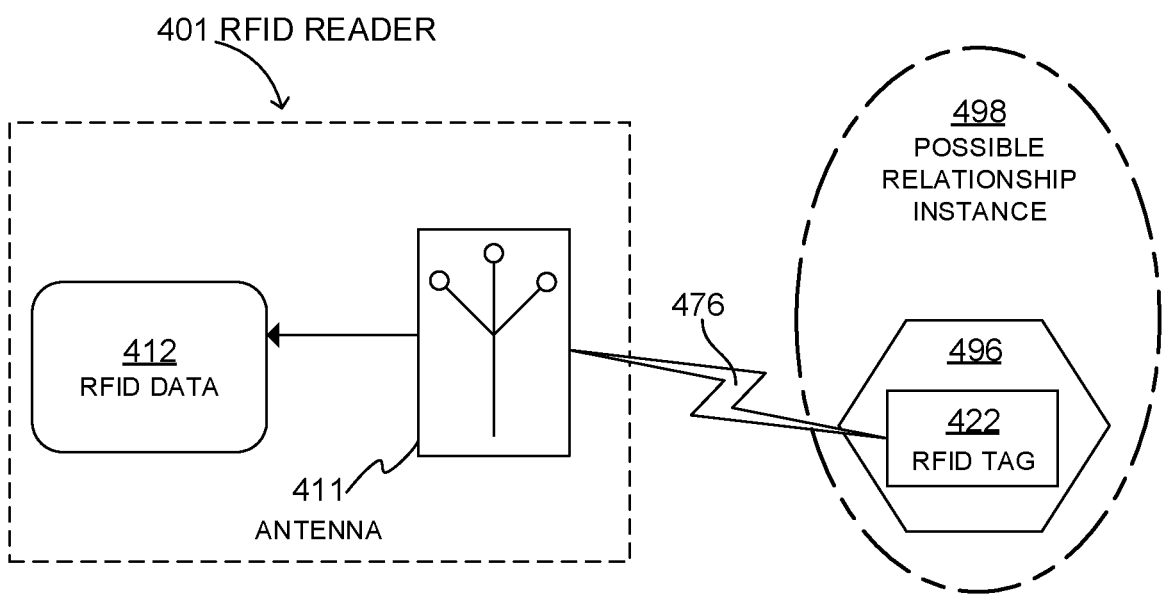
FIG. 4 is a diagram showing sample aspects of embodiments of the present disclosure involving RFID components within a computing device which may be used by a user, according to embodiments of the present disclosure.

FIG. 4 is a diagram showing sample aspects of embodiments of the present disclosure involving RFID components within a computing device which may be used by a user, according to embodiments of the present disclosure.

The RFID reader 401 includes an antenna 411 and generates RFID data 412. The RFID reader 401 may be implemented as part of the sensor 110. The antenna 411 may sense an RFID tag 422 which indicates an item 496 as indicated by the sensing signal 476. The RFID tag 422 may be located within, on, nearby, or in a different area than, the item 496. The item 496 may be related to a possible relationship instance 498 between the user 192 and an entity, such as a host entity. The data obtained as a result of sensing the RFID tag 422 is then used to generate the RFID data 412 by the RFID reader 401. The system 100 uses the RFID data 412 as item sensed data 112 to produce item identity data 125.

Figure 5:
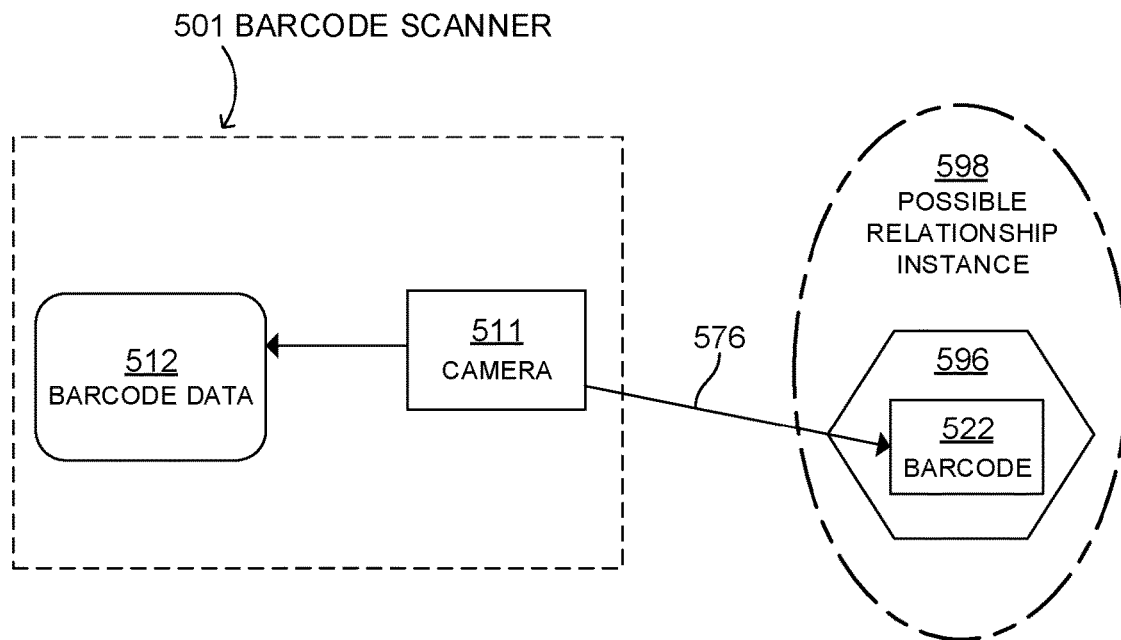
FIG. 5 is a diagram showing sample aspects of embodiments of the present disclosure involving camera components within a computing device which may be used by a user, according to embodiments of the present disclosure.

FIG. 5 is a diagram showing sample aspects of embodiments of the present disclosure involving camera components within a computing device which may be used by a user, according to embodiments of the present disclosure.

The barcode scanner 501 includes a camera 511 and generates barcode data 512. The camera 511 may be any sensor used to read barcodes or other machine readable codes. The barcode reader 501 may be implemented as part of the sensor 110. The camera 511 may read a barcode 522 which indicates an item 596 as indicated by the arrow 576. The barcode 522 may be located within, on, nearby, or in a different area than, the item 596. The item 596 may be related to a possible relationship instance 598 between the user 192 and an entity, such as a host entity. The data obtained as a result of reading the barcode 522 by the camera 511 may be used by the barcode scanner 501 to generate barcode data 512. The system 100 uses the barcode data 512 as item sensed data 112 to produce item identity data 125.

Figure 6:
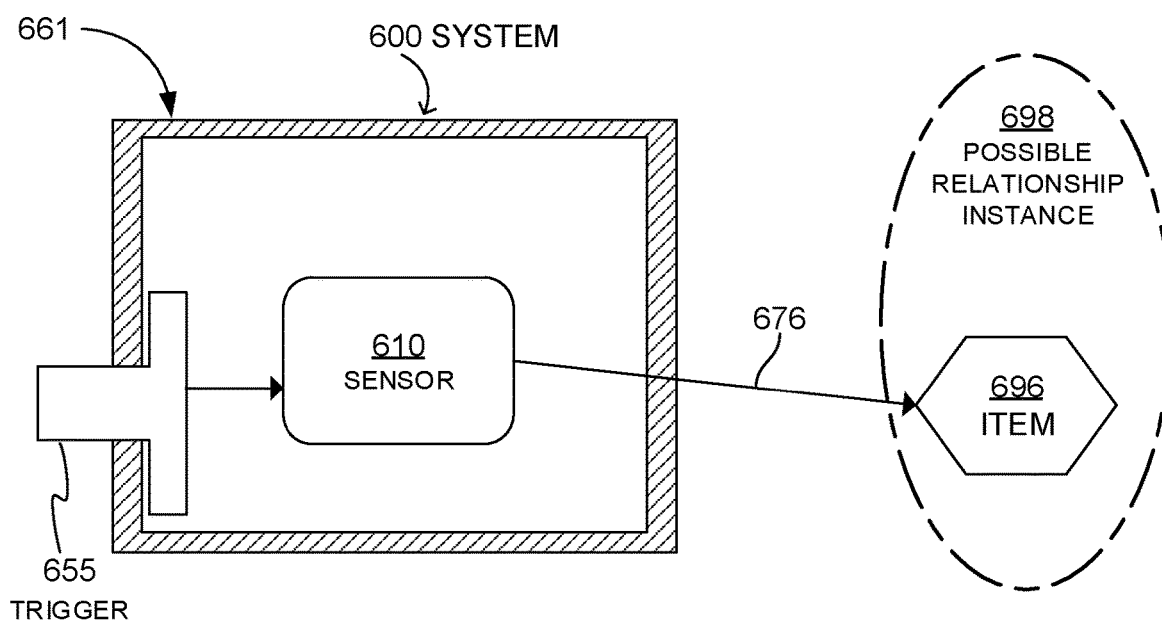
FIG. 6 is a diagram showing sample aspects of embodiments of the present disclosure involving sensor components within a computing device which may be used by a user, according to embodiments of the present disclosure.

FIG. 6 is a diagram showing sample aspects of embodiments of the present disclosure involving sensor components within a computing device which may be used by a user, according to embodiments of the present disclosure.

The system 600 includes a housing 661, a sensor 610, and a trigger 655. When the trigger 655 is activated the system 600 activates the sensor 610. The trigger 655 may be any type of trigger, button, lever, etc., used to obtain an indication that an action should be taken. Additionally, the trigger 655 may be electromechanical, mechanical, digital, and so on. In embodiments, the system 600 may obtain a voice command which can be used as an indication for the system 600 to activate the sensor 610, thus acting as the trigger 655. In embodiments, multiple actions are taken to activate the trigger 655, such as activating multiple triggers, obtaining user input along with activation of a trigger, and so on. When the sensor 610 is activated it may detect an item 696, as indicated by the arrow 676. The item 696 may be related to a possible relationship instance 698 between the user 192 and an entity, such as a host entity.

Figure 7:
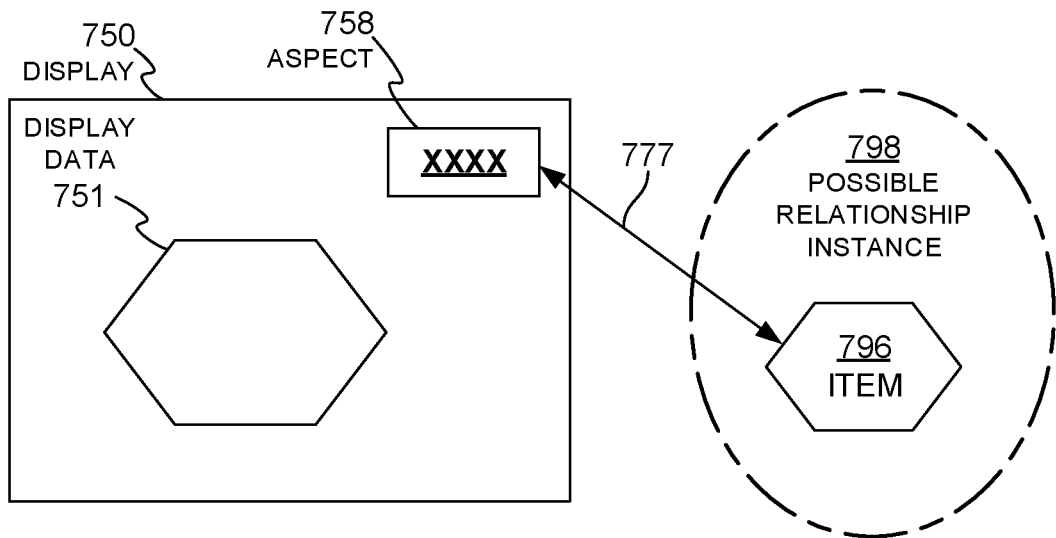
FIG. 7 is a diagram showing sample aspects of embodiments of the present disclosure involving a display generated by a computing device which may be presented to a user, according to embodiments of the present disclosure.

FIG. 7 is a diagram showing sample aspects of embodiments of the present disclosure involving a display generated by a computing device which may be presented to a user, according to embodiments of the present disclosure.

The display 750 includes display data 751 and an aspect 758. The display 750 obtains information related to the aspect 758 and display data 751 used to present the aspect 758 and display data 751 to a user 192. The aspect 758 may include information related to an item 796 as indicated by the double arrow 777. The item 796 may be related to a possible relationship instance 798 between a user 192 and an entity, such as a host entity.

Figure 8:
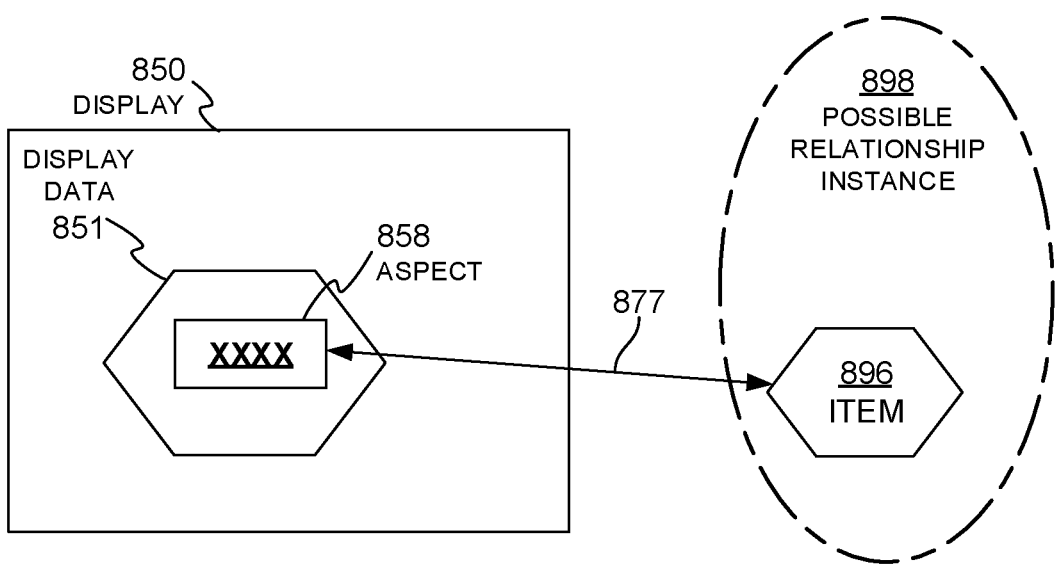
FIG. 8 is a diagram showing sample aspects of embodiments of the present disclosure involving a display generated by a computing device which may be presented to a user, according to embodiments of the present disclosure.

FIG. 8 is a diagram showing sample aspects of embodiments of the present disclosure involving a display generated by a computing device which may be presented to a user, according to embodiments of the present disclosure.

The display 850 includes display data 851 and an aspect 858. The display 850 superimposes the aspect 858 over the display data 851. For example, the display data 851 may include an image, or a portion of an image, of an item, such as item 896. The aspect 858 may include information related to an item 896 as indicated by the double arrow 877. The item 896 may be related to a possible relationship instance 898 between a user 192 and an entity, such as a host entity.

Figure 9:
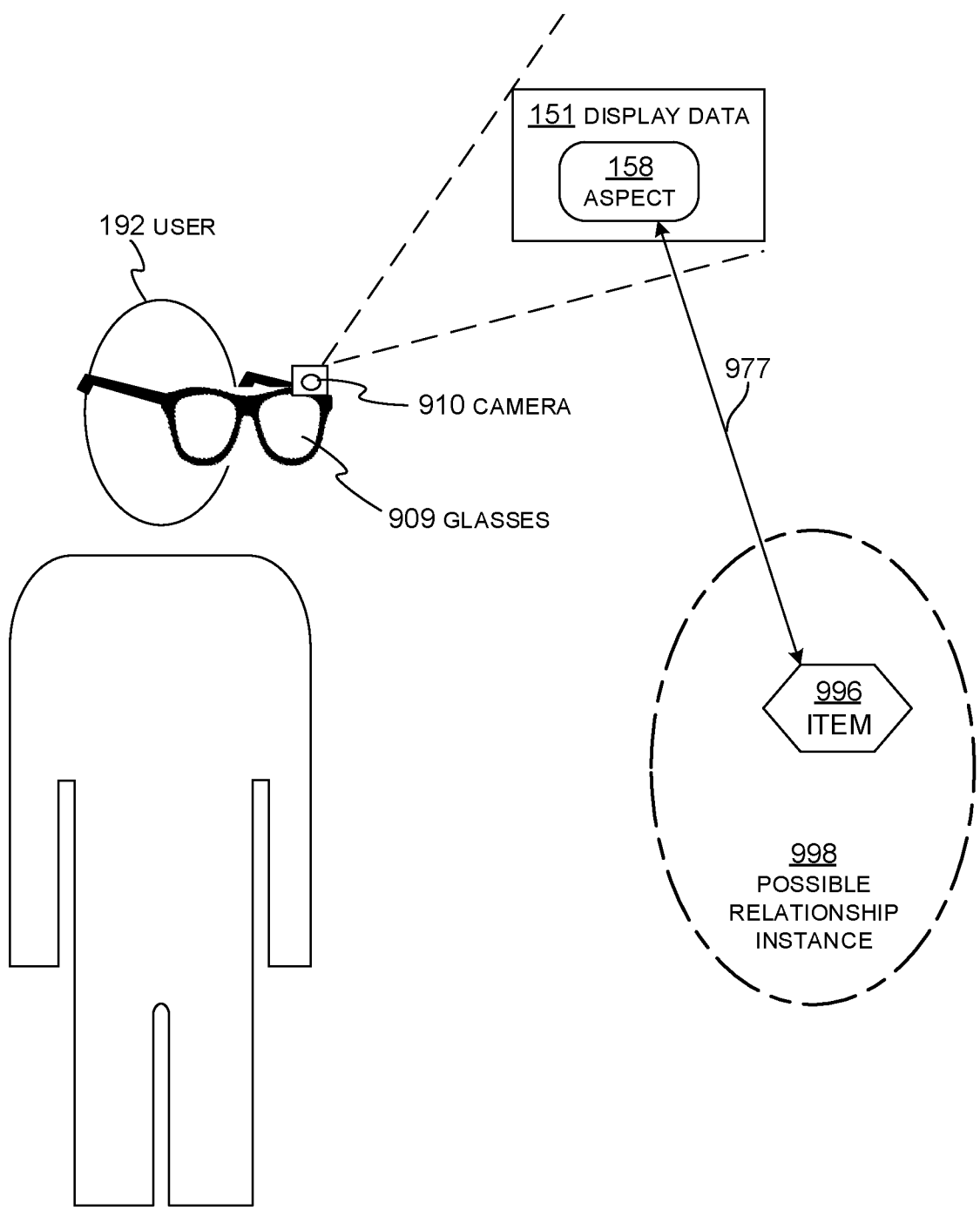
FIG. 9 is a diagram showing sample aspects of embodiments of the present disclosure involving glasses which may be used by a user, according to embodiments of the present disclosure.

FIG. 9 is a diagram showing sample aspects of embodiments of the present disclosure involving glasses which may be used by a user, according to embodiments of the present disclosure.

The user 192 may wear, or operate, glasses 909, which may include a camera 910. The glasses 909 may implement one or more aspects of the system 100. Additionally, the glasses 909 may include a display, such as a heads-up display, which may be used to display the display data 151 and aspect 158. Furthermore, the glasses 909 may superimpose the aspect 158 on the display data 151.

The camera 910 may be used to generate display data 151 as well as to detect an item 996. The item 996 may be used to generate the aspect 158 as indicated by the double arrow 977. Furthermore, the aspect 158 may include information related to the item 996. The item 996 may be related to a possible relationship instance 998 between the user 192 and an entity, such as a host entity.

Figure 10:
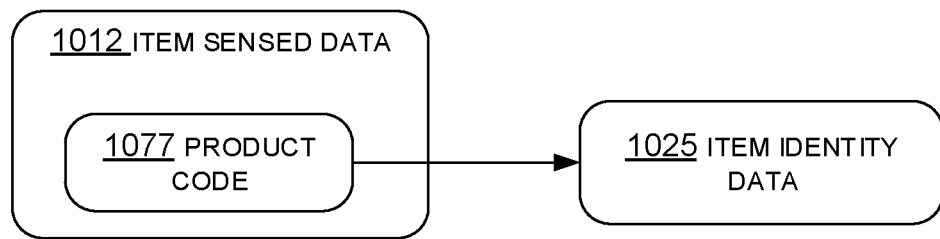
FIG. 10 is a diagram showing sample aspects of embodiments of the present disclosure involving processing item sensed data, according to embodiments of the present disclosure.

FIG. 10 is a diagram showing sample aspects of embodiments of the present disclosure involving processing item sensed data, according to embodiments of the present disclosure.

The item sensed data 1012 may include a product code 1077. The product code 1077 may then be used by the system 100 to generate item identity data 1025. In embodiments, the system 100 may communicate with other systems to generate item identity data 1025 based on the product code 1077. For example, in a case where the product code 1077 is a UPC code, the system 100 may use the product code to identify the item by looking up item data for an item registered to that UPC code. The system 100 may communicate with a system of host premises to look up the item data based on the UPC code. In another example, where the product code 1077 is an ASIN code, the system 100 may communicate with a system hosting at least a portion of Amazon's product catalog to determine which product corresponds to the product code 1077. The system 100 may communicate with other systems via a network to obtain a base value of the item based on the product code 1077.

Figure 11:
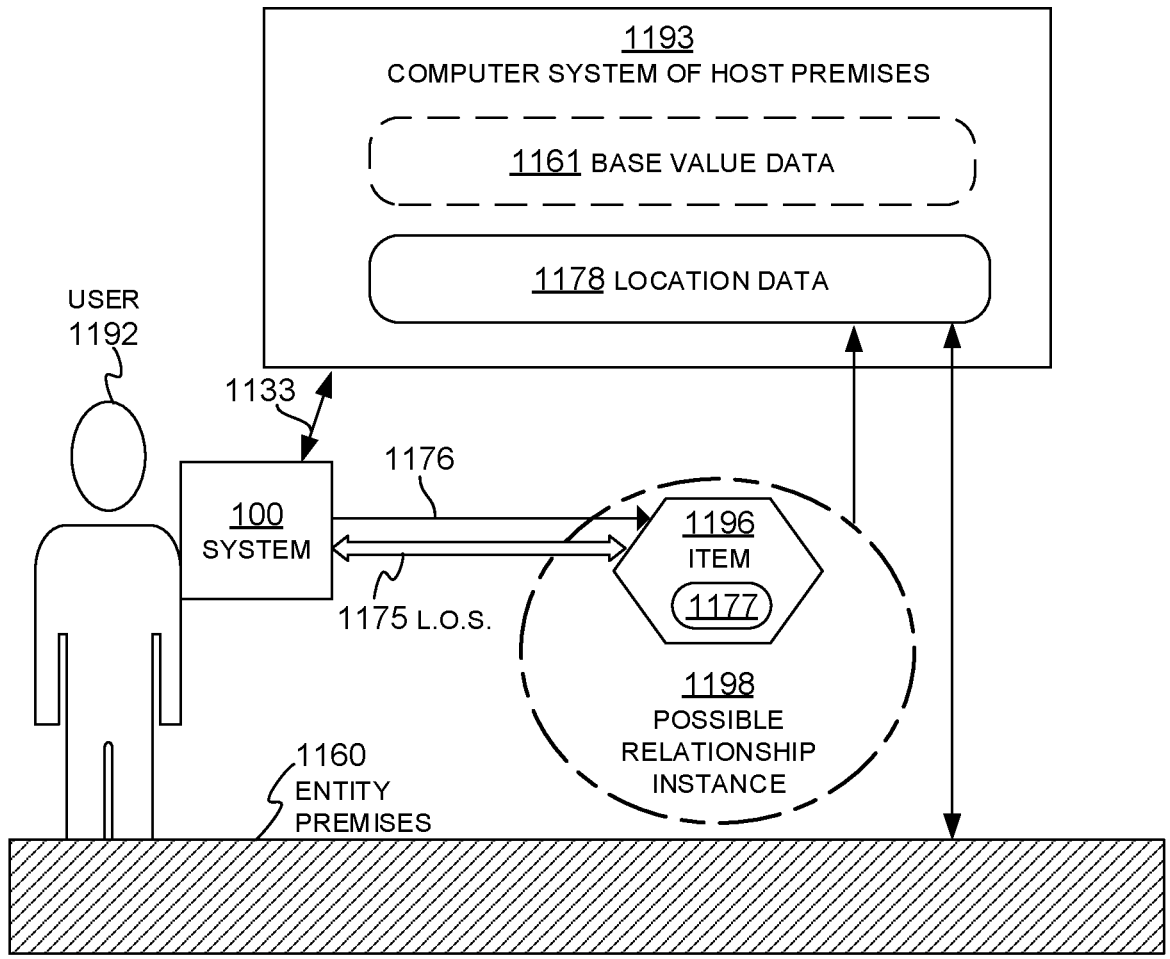
FIG. 11 is a diagram showing sample aspects of embodiments of the present disclosure involving a computer system of host premises, according to embodiments of the present disclosure.

FIG. 11 is a diagram showing sample aspects of embodiments of the present disclosure involving a computer system of host premises, according to embodiments of the present disclosure.

An entity premises 1160 represents the premises of a host entity, with which a user 1192 may enter into a possible relationship instance 1198 related to an item 1196. The entity premises 1160 may also include a computer system of host premises 1193. The computer system of host premises 1193 may include location data 1178, which indicates a location of the entity premises 1160. In embodiments, the computer system of host premises 1193 includes base value data 1161. The base value data 1161 includes data related to the base value of the various items which may be part of a possible relationship instance 1198.

The user 1192 may use a system 100 to obtain resource information related to the possible relationship instance 1198. As depicted in FIG. 11, the system 100 may be within the line of sight 1175 of the item 1196. The system 100 may sense the item 1196, as seen by the arrow 1176. The sensed data obtained by the system 100 may include a product code 1177, which may be attached to, near, representing, etc., the item. In embodiments, the system 100 may additionally communicate with the computer system of host premises 1193 to obtain a location data 1178, as indicated by the communication link 1133. The system 100 may additionally communicate with the computer system of host premises 1193 to obtain base value data 1161 for the item 1196, as indicated by the communication link 1133. The system 100 may then use the sensed item data to generate item identity data. In embodiments, the system 100 uses one or more of the item identity data, location data 1178, and the base value data 1161 to obtain resource information 145 related to the possible relationship instance 1198.

Figure 12:
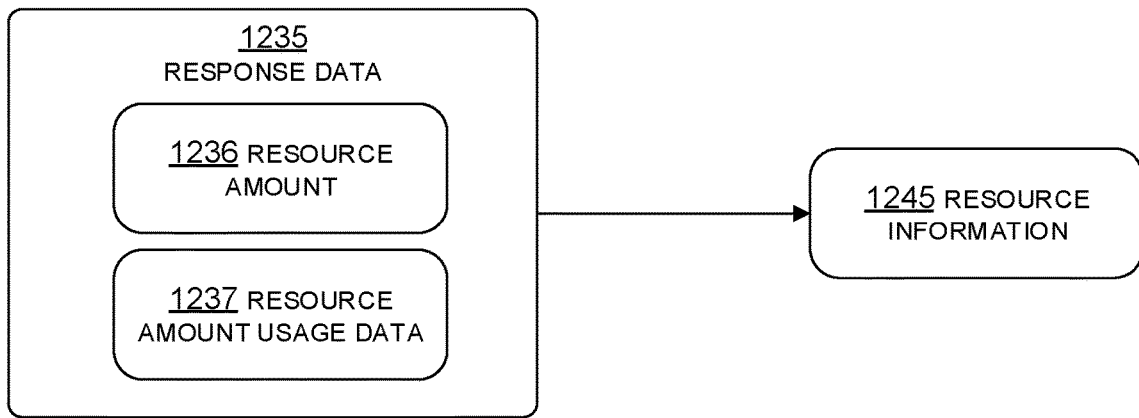
FIG. 12 is a diagram showing sample aspects of embodiments of the present disclosure involving processing response data, according to embodiments of the present disclosure.

FIG. 12 is a diagram showing sample aspects of embodiments of the present disclosure involving processing response data, according to embodiments of the present disclosure.

The response data 1235 includes a resource amount 1236 and resource amount usage data 1237. The system 100 may utilize the resource amount 1236 and resource amount usage data 1237 to generate resource information 1245. In embodiments, the resource amount usage data 1237 may be used to compare how a domain uses a resource amount 1236 to resource use priorities which may be specified by a user. The system 100 may display the resource information 1245 to a user 192.

Figure 13:
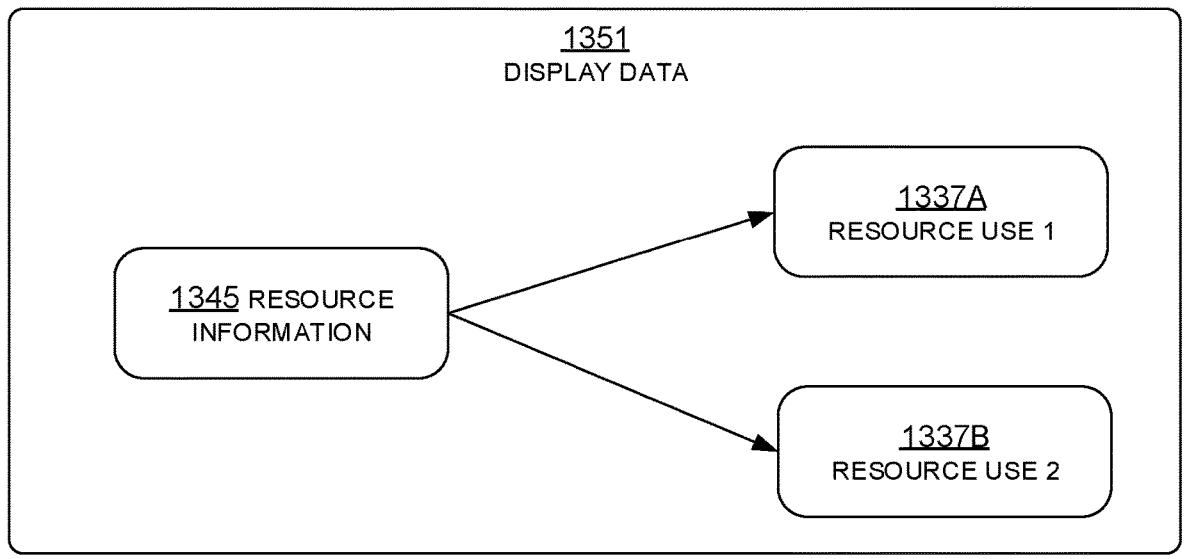
FIG. 13 is a diagram showing sample aspects of embodiments of the present disclosure involving displaying response data, according to embodiments of the present disclosure.

FIG. 13 is a diagram showing sample aspects of embodiments of the present disclosure involving displaying response data, according to embodiments of the present disclosure.

The display data 1351 includes resource information 1345, which can be used to identify one or more resource uses, such as the resource use 1 1337A and resource use 2 1337B. The system 100 may use the display data 1351 to display the resource information to a user 192 by using a display 150. The resource uses 1337A and 1337B may be used to display to a user whether their resource use priorities are met by the possible relationship instances. The display data 1351 may include an image, or a portion of an image of an item, which the resource information 1345 may be superimposed on top of.

Figure 14:
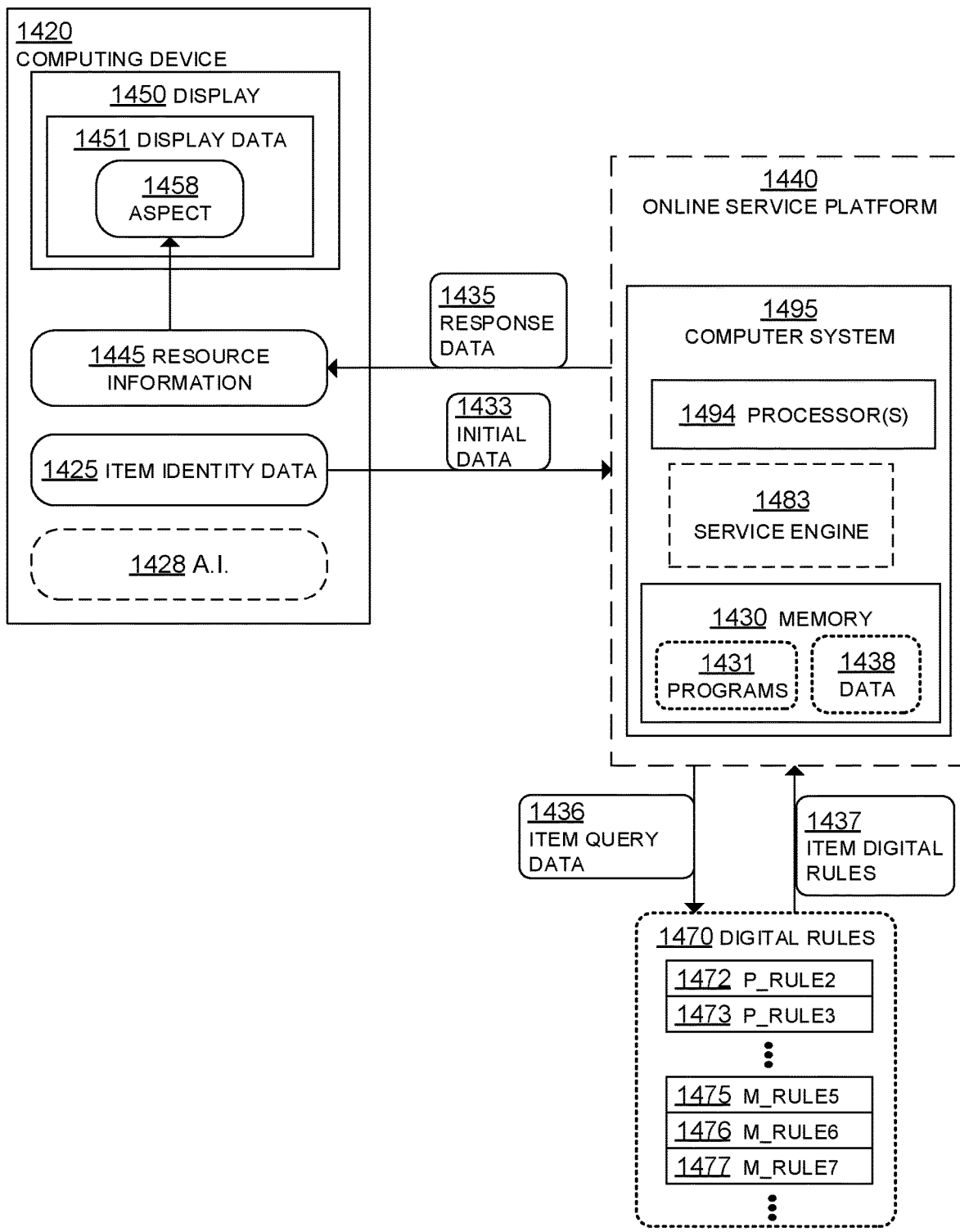
FIG. 14 is a diagram of sample aspects for describing operational examples and use cases of embodiments.

FIG. 14 is a diagram of sample aspects for describing an online software platform (OSP) 1440 which receives initial data and uses the initial data to generate resource information for an item related to a possible relationship instance. It will be recognized that aspects of FIG. 14 have similarities with aspects of FIG. 1. Portions of such aspects may be implemented as described for analogous aspects of FIG. 1.

The computing device 1420 and its illustrated components operate in a similar manner to the computing facility 120 of FIG. 1. The A.I. 1428 may operate as was described for the Learning Functionality 128 of FIG. 1. The initial data 1433 and response data 1435 are used in a similar manner to the initial data 133 and response data 135 of FIG. 1. The OSP 1440 and its illustrated components operate in a similar manner to the OSP 140.

The OSP 1440 receives the initial data 1433 and extracts item identity data from the initial data 1433. In embodiments, the OSP 1440 additionally extracts other data related to the item from the initial data 1433, such as base value data, location data, etc. The OSP 1440 uses the extracted data to obtain item digital rules 1437 from a database of digital rules 1470, which are used to obtain the resource information, such as a resource amount remitted to a domain, one or more resource use priorities, etc. The OSP 1440 may package the item digital rules 1437 in the response data 1435 to be transmitted to the computing device 1420. The computing device 1420 processes the response data 1435 to obtain resource information 1445. The resource information 1445 is displayed by using the display 1450.

In embodiments, stored digital rules 1470 may be accessed by the computer system 1495. These rules 1470 are digital in that they are implemented for use by software. For example, these rules 1470 may be implemented within programs 1431 and data 1438. The data portion of these rules 1470 may alternately be implemented in memories in other places, which can be accessed via the network 191. These rules 1470 may be accessed responsive to receiving a dataset, such as the item query data 1436.

The digital rules 1470 may include main rules, which can thus be accessed by the computer system 1495. In this example, three sample digital main rules are shown explicitly, namely M_RULE5 1475, M_RULE6 1476, and M_RULE7 1477. In this example, the digital rules 1470 also include digital precedence rules P_RULE2 1472 and P_RULE3 1473, which can thus be further accessed by the computer system 1495. The digital rules 1470 may include additional rules and types of rules, as suggested by the vertical dot-dot-dots.

In embodiments, a certain one of the digital main rules may be identified from among the accessed stored rules by the computer system 1495. In particular, values of the item query data 1436 can be tested against logical conditions of the digital main rules, as described later in this document, to obtain the item digital rules 1437.

In embodiments, at least some of the digital main rules include respective conditions and respective consequents associated with the respective conditions, respectively. And, for a certain digital main rule, if its certain condition P is met, then its certain consequent Q is what happens or becomes applied. Of course, one or more of the digital rules 1470 may have more than one conditions P that both must be met, and so on. And some of these digital rules 1470 may be searched for, and grouped, according first to one of the conditions, and then the other.

In embodiments, therefore, identifying is performed by recognizing, by the computer system 1495, that a certain condition of a certain one of the accessed digital main rules is met by one or more of the values of the dataset.

A number of examples are possible for how to recognize that a certain condition of a certain digital rule is met by at least one of the values of the dataset. For instance, the certain condition could define a boundary of a region that is within a space. The region could be geometric, and be within a larger space. The region could be geographic, within the space of a city, a state, a country, a continent or the earth. The boundary of the region could be defined in terms of numbers according to a coordinate system within the space. In the example of geography, the boundary could be defined in terms of groups of longitude and latitude coordinates. In such embodiments, the certain condition could be met responsive to the characterized attribute of the dataset being in the space and within the boundary of the region instead of outside the boundary. For instance, the attribute could be a location of the entity, and the one or more values of the item query data 1436 that characterize the location could be one or more numbers or an address, or longitude and latitude. The condition can be met depending on how the one or more values compare with the boundary. For example, the comparison may reveal that the location is in the region instead of outside the region. The comparison can be made by rendering the characterized attribute in units comparable to those of the boundary. For example, the characterized attribute could be an address that is rendered into longitude and latitude coordinates, and so on.

The above embodiments are only examples, and not limiting.

Where more than one of the digital main rules are found that could be applied, there are additional possibilities. For instance, the computer system 1495 of FIG. 14 may further access at least one stored digital precedence rule, such as P_RULE2 1472 or P_RULE3 1473. Accordingly, the certain digital main rule may be thus identified also from the digital precedence rule. In particular, the digital precedence rule may decide which one or more of the digital main rules is to be applied. To continue the previous example, if a value of the item query data 1436 characterizes a location, and the location is within multiple overlapping regions according to multiple rules, the digital precedence rule may decide that all of them are to be applied, or less than all of them are to be applied. Equivalent embodiments are also possible, where digital precedence rules are applied first to limit the iterative search, so as to test the applicability of fewer than all the rules.

The item digital rules 1437 obtained as a result of applying the digital rules 1470 to the item query data 1436 may include information which is later interpreted by the computing device 1420 as resource information 1445. For instance, the item digital rules 1437 may include: a resource amount to be remitted if a relationship instance including the item occurs, one or more resource use priorities, data related to a domain which related to the possible relationship instance, a resource value of the item, etc.

The computer system 1495 is similar to the computer system 195 of FIG. 1. The computer system 1495 includes one or more processors 1494, memory 1430, and a service engine 1483. The one or processors 1494 are similar to the one or more processors 194. The memory 1430 is similar to the memory 130. The service engine 11483 is similar to the service engine 183. The service engine 1483 may be used to access, store, apply, etc., the digital rules 1470.

Figure 15:
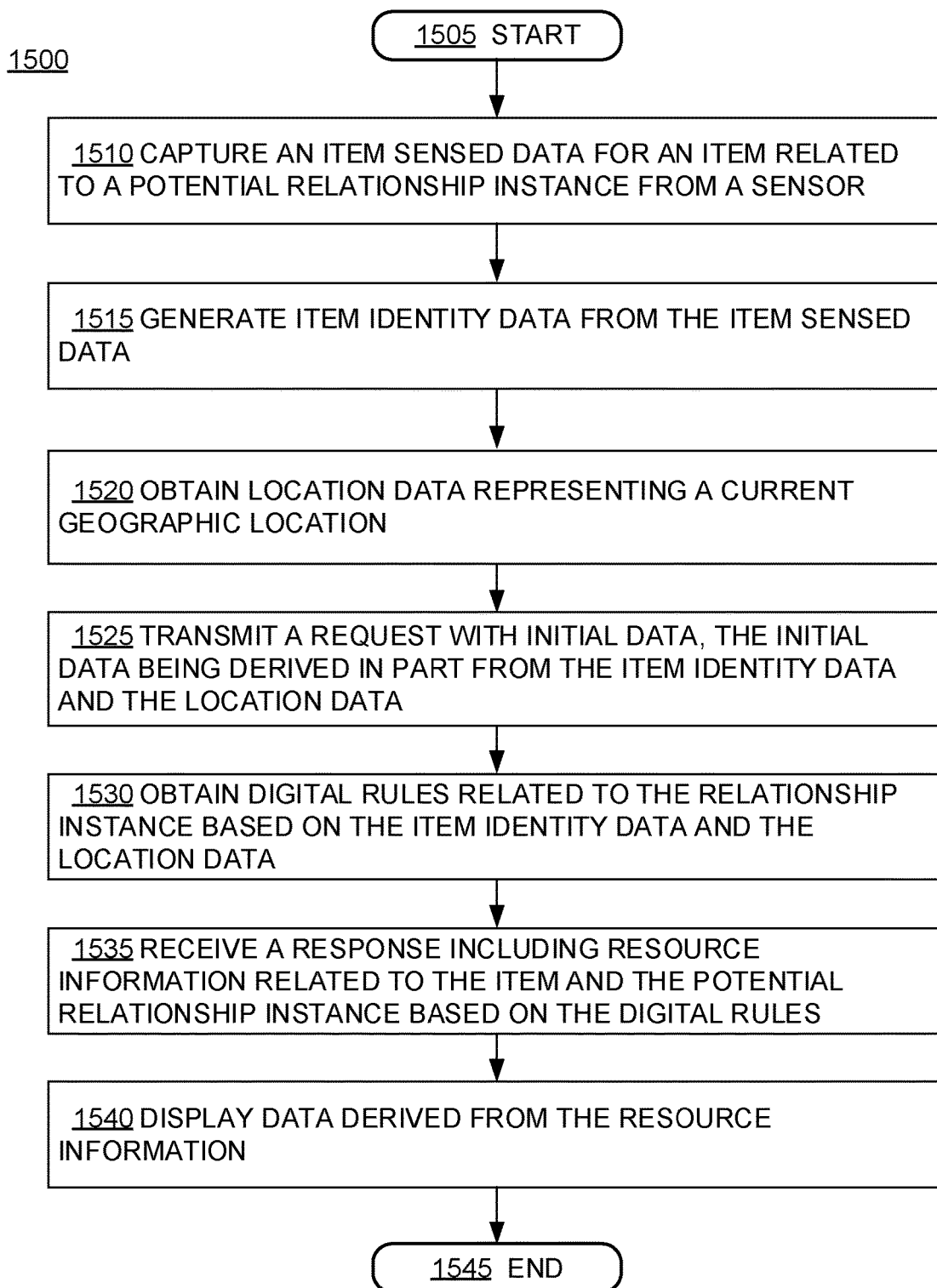
FIG. 15 is a flowchart for illustrating a sample method for obtaining location data, generating item identity data, and displaying resource information related to the location data and an item identified by the item identity data, according to embodiments of the present disclosure.

FIG. 15 is a flowchart for illustrating a sample method for obtaining location data, generating item identity data, and displaying resource information related to the location data and an item identified by the item identity data, according to embodiments of the present disclosure.

The method 1500 starts at 1505.

At 1510, the system 100 captures item sensed data 112 for an item 196 related to a possible relationship instance 198 between a user 192 and a host entity from a sensor 110.

At 1515, the system 100 generates item identity data 125 for the item 196 based on the item sensed data 112.

At 1520, the system 100 obtains location data representing a current geographic location of one or more of: the system 100, the item 196, a host entity offering the item 196, etc.

At 1525, the system 100 derives initial data 133 from the item identity data 125 and the location data and transmits a request 132 to an OSP 140 which contains the initial data.

At 1530, the OSP 140 obtains digital rules 1470 related to the possible relationship instance 198 based on the item identity data 125 and the location data. The OSP 140 may utilize the digital rules 1470 to generate a response 141.

At 1535, the system 100 receives the response 141 generated based on the digital rules from the OSP 140 which includes resource information 145 related to the item 196 and the possible relationship instance 198.

At 1540, the system 100 displays data derived from the resource information 145 by using the display 150.

The method ends at 1545.

Figure 16:
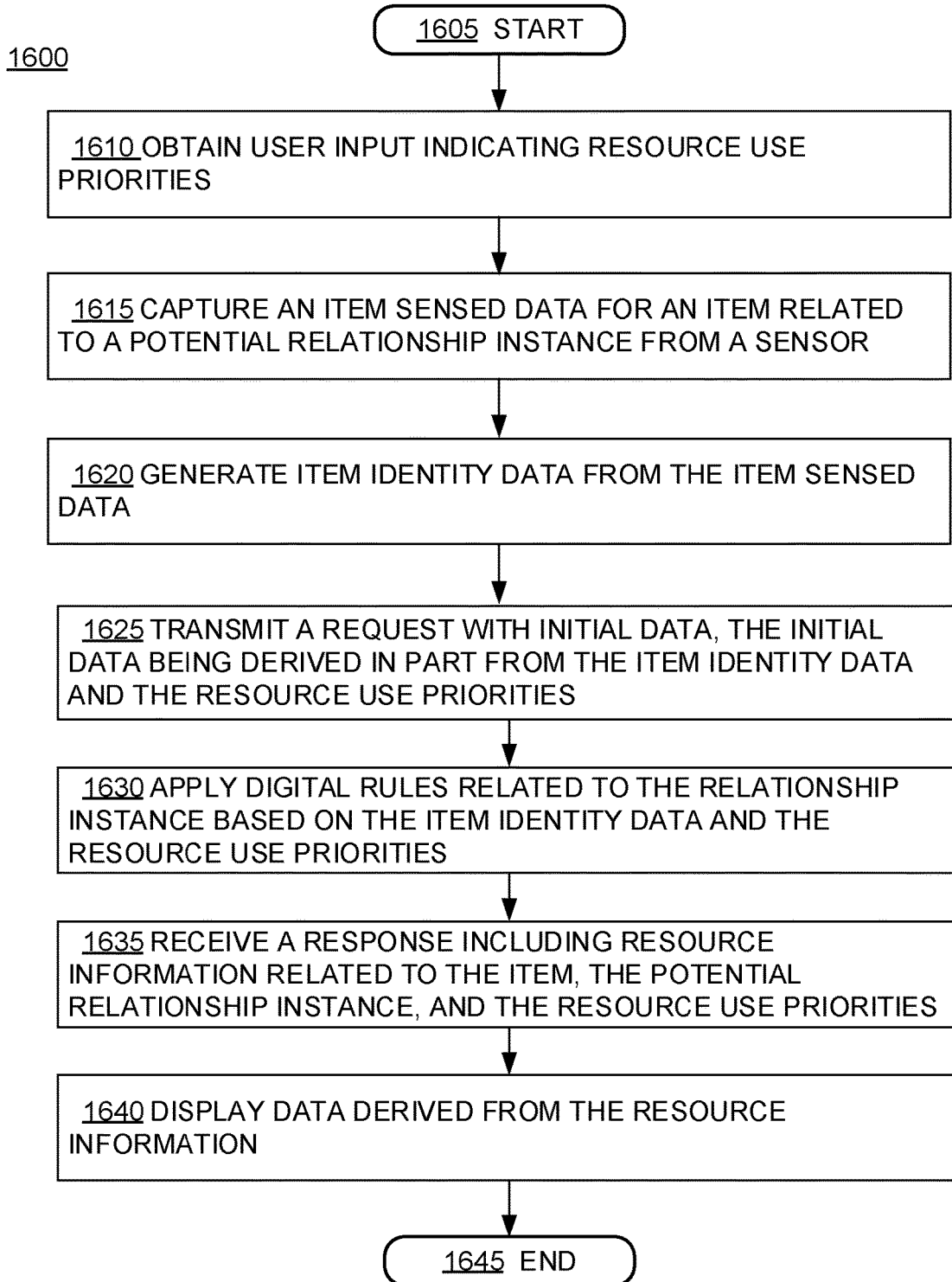
FIG. 16 is a flowchart for illustrating a sample method for obtaining resource use priorities, obtaining resource information, and comparing the resource information to the resource use priorities, according to embodiments of the present disclosure.

FIG. 16 is a flowchart for illustrating a sample method for obtaining resource use priorities, obtaining resource information, and comparing the resource information to the resource use priorities, according to embodiments of the present disclosure.

The method 1600 starts at 1605.

At 1610, the system 100 obtains user input indicating one or more resource use priorities.

At 1615, the system 100 captures item sensed data 112 for an item 196 related to a possible relationship instance 198 between a user 192 and a host entity from a sensor 110.

At 1620, the system 100 generates item identity data 125 for the item 196 based on the item sensed data 112.

At 1625, the system 100 derives initial data 133 from the item identity data 125 and transmits a request 132 to an OSP 140 which contains the initial data.

At 1630, the OSP 140 obtains digital rules 1470 related to the possible relationship instance 198 based on the item identity data 125 and the resource use priorities. The OSP 140 may utilize the digital rules 1470 to generate a response 141.

At 1635, the system 100 receives the response 141 generated based on the digital rules from the OSP 140 which includes resource information 145 related to the item 196 and the possible relationship instance 198. The response 141 may additionally include data related to the resource use priorities, such as data indicating how a domain utilizes a resource amount obtained from the possible relationship instance.

At 1640, the system 100 displays data derived from the resource information 145 by using the display 150.

The method ends at 1645.

Figure 17:
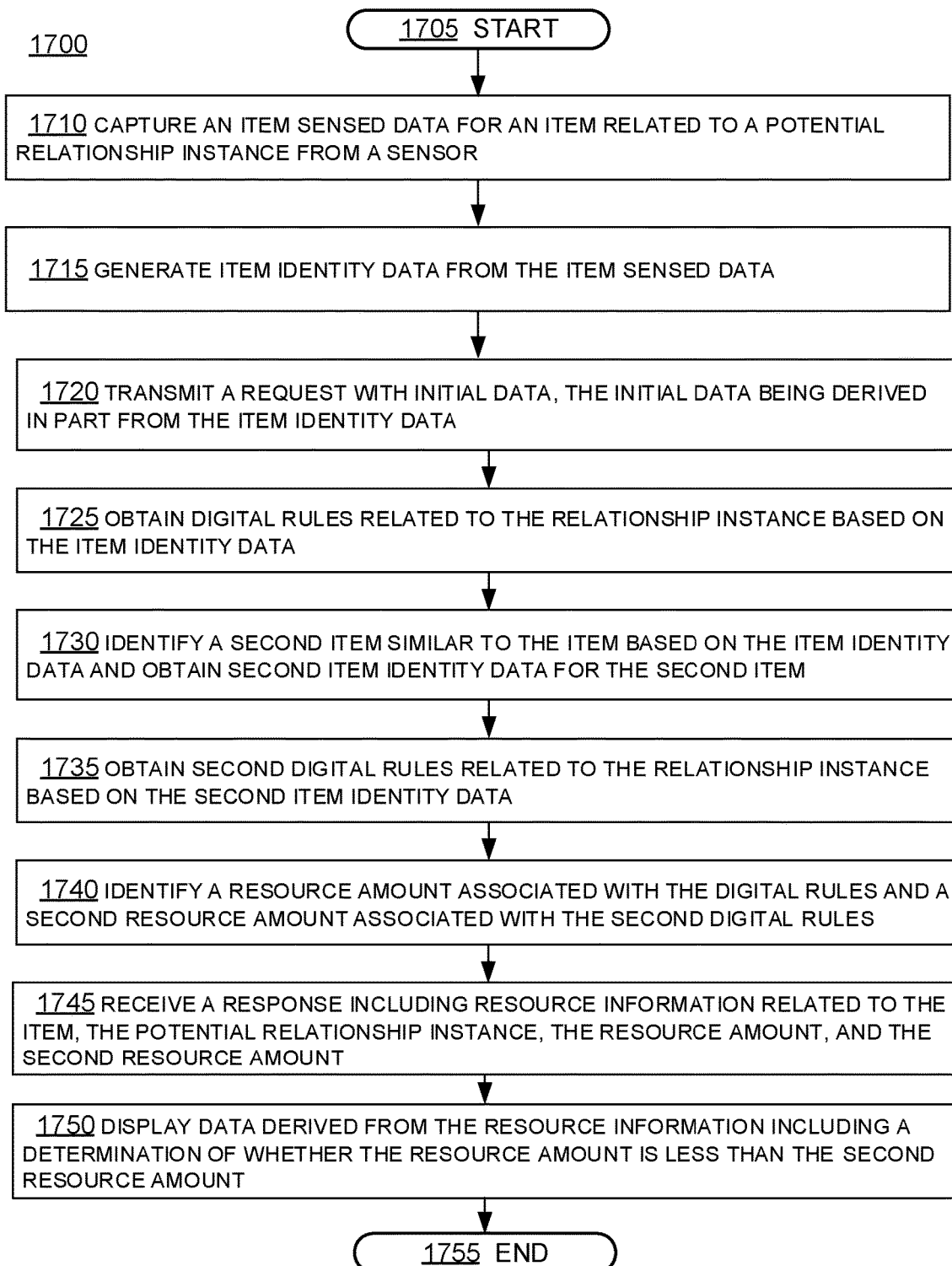
FIG. 17 is a flowchart for illustrating a sample method for obtaining location data, generating item identity data, and displaying resource information related to the location data and an item identified by the item identity data, according to embodiments of the present disclosure.

FIG. 17 is a flowchart for illustrating a sample method for obtaining location data, generating item identity data, and displaying resource information related to the location data and an item identified by the item identity data, according to embodiments of the present disclosure.

The method 1700 starts at 1705.

At 1710, the system 100 captures item sensed data 112 for an item 196 related to a possible relationship instance 198 between a user 192 and a host entity from a sensor 110.

At 1715, the system 100 generates item identity data 125 for the item 196 based on the item sensed data 112.

At 1720, the system 100 derives initial data 133 from the item identity data 125 and transmits a request 132 to an OSP 140 which contains the initial data.

At 1725, the OSP 140 obtains digital rules 1470 related to the possible relationship instance 198 based on the item identity data 125.

At 1730, the OSP 140 identifies another item similar to the item based on the item identity data 125. The OSP obtains second item identity data for the other item.

At 1735, the OSP 140 obtains second digital rules related to the possible relationship instance 198 based on the second item identity data 125.

At 1740, the OSP 140 identifies a resource amount associated with the digital rules 1470 and a second resource amount associated with the second digital rules.

At 1745, the system 100 receives the response 141, generated based on the digital rules and the second digital rules, from the OSP 140 which includes resource information 145 related to the item 196 and the possible relationship instance 198. The response 141 may also include second resource information related to the other item. The response 141 may also include the resource amount and the second resource amount.

At 1750, the system 100 displays data derived from the resource information 145 by using the display 150. The system 100 may additionally display a determination of whether the resource amount is less than the second resource amount.

The method ends at 1755.

Operational Examples—Use Cases

The above-mentioned embodiments have one or more uses. Aspects presented below may be implemented as was described above for similar aspects. (Some, but not all of these aspects have even similar reference numerals.)

Operational examples and sample use cases are possible where the attribute of an entity in a dataset is any one of the entity's name, type of entity, a physical location such as an address, a contact information element, an affiliation, a characterization of another entity, a characterization by another entity, an association or relationship with another entity (general or specific instances), an asset of the entity, a declaration by or on behalf of the entity, and so on. Different resources may be produced in such instances, and so on.

The computer system 195 may be used to help customers, such as a host entity, with tax compliance. Further in this example, the computer system 195 is part of an OSP 140 that is implemented as a Software as a Service (SaaS) provider, for being accessed by the user 192 online. Alternately, the functionality of the computer system 195 may be provided locally to a user.

The user 192 may be standalone. The user 192 may use a computing facility 120 that interfaces with a display 150 and a sensor 110. In embodiments, the user 192 encounters an item 196 within a host premises. The host premises can be a business, such as a seller of items, a reseller, a buyer, and so on. In such instances, the user 192 can be a customer, an employee, a contractor, or an agent of the host entity. In use cases the host entity is a seller, the user 192 is a customer, and together they are engaging in a possible relationship instance 198, such as a possible buy-sell transaction. The possible buy-sell transaction may involve an operation, such as an exchange of data to form an agreement. This operation can be performed in person, or over the network 191, etc. In such cases the host entity can even be an online seller, but that is not necessary.

In a number of instances, the host entity uses software applications to manage their business activities, such as sales, resource management, production, inventory management, delivery, billing, and so on. The host entity may further use accounting applications to manage purchase orders, sales invoices, refunds, payroll, accounts payable, accounts receivable, and so on. Such software applications, and more, may be used locally by the host entity, such as at a computer system of host premises 1193, or from an online software platform (OSP) 140 that has been engaged for this purpose by the host entity. In such use cases, the OSP 140 can be a Mobile Payments system, a Point Of Sale (POS) system, an Accounting application, an Enterprise Resource Planning (ERP) provider, an e-commerce provider, an electronic marketplace, a Customer Relationship Management (CRM) system, and so on.

Businesses have tax obligations to various tax authorities of respective tax jurisdictions. A first challenge is in making the related determinations. Tax-related determinations, made for the ultimate purpose of tax compliance, are challenging because the underlying statutes and tax rules and guidance issued by the tax authorities are very complex. There are various types of tax, such as sales tax, use tax, excise tax, value-added tax, and issues about cross-border taxation including customs and duties, and many more. Some types of tax are industry specific. Each type of tax has its own set of rules. Additionally, statutes, tax rules, and rates change often, and new tax rules are continuously added. Compliance becomes further complicated when a taxing authority offers a temporary tax holiday, during which certain taxes are waived.

Tax jurisdictions are defined mainly by geography. Businesses have tax obligations to various tax authorities within the respective tax jurisdictions. There are various tax authorities, such as that of a group of countries, of a single country, of a state, of a county, of a municipality, of a city, of a local district such as a local transit district and so on. So, for example, when a business sells items in transactions that can be taxed by a tax authority, the business may have the tax obligations to the tax authority. These obligations include requiring the business to: a) register itself with the tax authority's taxing agency, b) set up internal processes for collecting sales tax in accordance with the sales tax rules of the tax authority, c) maintain records of the sales transactions and of the collected sales tax in the event of a subsequent audit by the taxing agency, d) periodically prepare a form ("tax return") that includes an accurate determination of the amount of the money owed to the tax authority as sales tax because of the sales transactions, e) file the tax return with the tax authority by a deadline determined by the tax authority, and f) pay ("remit") that amount of money to the tax authority. In such cases, the filing and payment frequency and deadlines are determined by the tax authority.

A challenge for businesses is that the above-mentioned software applications generally cannot provide tax information that is accurate enough for the businesses to be tax compliant with all the relevant tax authorities. The lack of accuracy may manifest itself as errors in the amounts determined to be owed as taxes to the various tax authorities, and it is plain not good to have such errors. For example, businesses that sell products and services have risks whether they over-estimate or under-estimate the sales tax due from a sale transaction. On the one hand, if a seller over-estimates the sales tax due, then the seller collects more sales tax from the buyers than was due. Of course, the seller may not keep this surplus sales tax, but instead must pay it to the tax authorities—if they cannot refund it to the buyers. If a buyer later learns that they paid unnecessarily more sales tax than was due, the seller risks at least harm to their reputation. Sometimes the buyer will have the option to ask the state for a refund of the excess tax by sending an explanation and the receipt, but that is often not done as it is too cumbersome. On the other hand, if a seller under-estimates the sales tax due, then the seller collects less sales tax from the buyers, and therefore pays less sales tax to the authorities than was actually due. That is an underpayment of sales tax that will likely be discovered later, if the tax authority audits the seller. Then the seller will be required to pay the difference, plus fines and/or late fees, because ignorance of the law is not an excuse. Further, one should note that sales taxes are considered trust-fund taxes, meaning that the management of a company can be held personally liable for the unpaid sales tax.

For sales in particular, making correct determinations for sales and use tax is even more difficult. There are a number of factors that contribute to its complexity.

First, some state and local tax authorities have origin-based tax rules, while others have destination-based tax rules. Accordingly, a sales tax may be charged from the seller's location or from the buyer's location.

Second, the various tax authorities assess different, i.e., non-uniform, percentage rates of the sales price as sales tax, for the purchase and sale of items that involve their various tax jurisdictions. These tax jurisdictions include various states, counties, cities, municipalities, special taxing jurisdictions, and so on. In fact, there are over 10,000 different tax jurisdictions in the US, with many partially overlapping.

Third, in some instances no sales tax is due at all because of the type of item sold. For example, in 2018 selling cowboy boots was exempt from sales tax in Texas, but not in New York. This non-uniformity gives rise to numerous individual taxability rules related to various products and services across different tax jurisdictions.

Fourth, in some instances no sales tax is due at all because of who the individual buyer is. For example, certain entities are exempt from paying sales tax on their purchases, so long as they properly create and sign an exemption certificate and give it to the seller for each purchase made. Entities that are entitled to such exemptions may include wholesalers, resellers, non-profit charities, educational institutions, etc. Of course, who can be exempt is not exactly the same in each tax jurisdiction. And, even when an entity is entitled to be exempt, different tax jurisdictions may have different requirements for the certificate of exemption to be issued and/or remain valid.

Fifth, it can be hard to determine which tax authorities a seller owes sales tax to. A seller may start with tax jurisdictions that it has a physical presence in, such as a main office, a distribution center or warehouse, an employee working remotely, and so on. Such ties with a tax jurisdiction establish the so-called physical nexus. However, a tax authority such as a state or even a city may set its own nexus rules for when a business is considered to be "engaged in business" with it, and therefore that business is subject to registration and collection of sales taxes. These nexus rules may include different types of nexus, such as affiliate nexus, click-through nexus, cookie nexus, economic nexus with thresholds, and so on. For instance, due to economic nexus, a remote seller may owe sales tax for sales made in the jurisdiction that are a) above a set threshold volume, and/or b) above a set threshold number of sales transactions.

Lastly, even where a seller might not have reached any of the thresholds for economic nexus, a number of states are promulgating marketplace facilitator laws that sometimes use such thresholds. According to such laws, intermediaries that are characterized as marketplace facilitators per laws of the state have an obligation, instead of the seller, to collect sales tax on behalf of their sellers, and remit it to the state. The situation becomes even more complex when a seller sells directly to a state, and also via such an intermediary.

To help with such complex determinations, the computer system 195 may be specialized for tax compliance. The computer system 195 may have one or more processors and memory, for example as was described for the computer system 195 of FIG. 1. In this example, the computer system 195 thus implements a tax engine to make the determinations of tax obligations. The tax engine can be as described for the service engine 183.

The computer system 195 may further store locally entity data, i.e., data of user 192 and/or a host entity, either of which/whom may be a customer, and/or a seller or a buyer in a sales transaction. The entity data may include profile data of the customer, and transaction data from which a determination of a tax obligation is desired. In the online implementation of FIG. 1, the OSP 140 has a database for storing the host entity data and/or user data. This data may be inputted by the user 192, or host entity, and/or caused to be downloaded or uploading by the user 192, or host entity, from the computing facility 120 or from the computer system of host premises 1193, or extracted from the computing facility 120 or from the computer system of host premises 1193, and so on. In other implementations, a simpler memory configuration may suffice for storing the entity and/or user data.

The OSP 140 may access digital rules 1470, which may be digital tax rules, for use by the service engine 183, which may be a tax engine. As part of managing the digital tax rules and tax engine, there may be continuous updates of the digital tax rules, by inputs gleaned from a set of different tax authorities. Updating may be performed by humans, or by computers, and so on. As mentioned above, the number of the different tax authorities in the set may be very large.

For a specific determination of a tax obligation, the computer system 195 may receive one or more datasets comprising initial data 133. In this example, the computing facility 120 transmits a request 132 that includes initial data 133, which is received by the computer system 195 parsing the received initial data 133. In this example, the initial data 133 encodes all of the item identity data 125, but that is not required, as mentioned earlier and other communicated data.

In this example, the initial data 133 has been received because it is desired to determine any tax obligations, tax usage information, and other tax data arising from the possible buy-sell transaction. As such, the sample initial data 133 has values that characterize attributes of the possible buy-sell transaction, as well as item identity data 125. The initial data 133 also has data indicating: the name of the host entity, the user, etc.; location data, such as an address, place(s) of business, prior nexus determinations with various tax jurisdictions, and so on; item identity information; relevant data of the user 192, such as resource use preferences, location data, exemption statuses, etc.; a base value of the item 196, such as a base price of the item; a date of the possible buy-sell transaction 198; etc. The system 100 may use one or more of a variety of methods to obtain the base price, or "sales price," of the item, such as: reading the base price from the item or a nearby price tag; via user input; by recognizing a code, such as a UPC, ASIN, etc.; and checking a list of items and base values which may be located on the system 100, located on a computer system of the entity selling the item, located on a third party computer system, located on the OSP 140, and so on. In such embodiments, the digital rules may be used to produce one or more resources from the base value; the one or more resources may correspond to sales tax, other taxes and assessments, indicating which jurisdictions are funded, and so on.

A UPC is a Universal Product Code which is printed on product packaging to aid in identifying the item. The code consists of two parts—a machine-readable barcode, which is a series of unique black bars, and the unique 12 digit number beneath it. An ASIN is an Amazon Standard Identification Number, which is a unique identifier of 10 letters and/or numbers for a product that is assigned by amazon.com. The ASIN is used for product-identification within Amazon's product catalog. For books, the ASIN is the same as the ISBN number (an International Standard Book Number), which can be 10 or 13 digits. An ISBN is calculated using a specific mathematical formula, and utilizes a check digit to validate the number.

The digital rules 1470 may be digital tax rules which have been created so as to accommodate tax rules that the set of different tax authorities promulgate within the boundaries of their tax jurisdictions. In such embodiments, the five digital rules shown in FIG. 14, namely P_RULE2 1472, P_RULE3 1473, M_RULE5 1475, M_RULE6 1476 and M_RULE7 1477, may each be digital tax rules. Similarly with FIG. 14, some of these digital tax rules may be digital main rules that determine the tax information specific to the item, such as the item digital rules 1437, while others can be digital precedence rules that determine which of the digital main rules is to be applied in the event of conflict. In some use cases, digital main rules may be about determining a sales tax or use tax being owed due to the possible buy-sell transaction at a certain percentage of the purchase price. Digital precedence rules may be digital tax rules that determine whether digital tax rules are to be applied for origin-based or destination-based jurisdictions, how to override for diverse taxability of individual items, for temporary tax holidays, for exemptions from having to pay sales tax based on who the buyer is, and also based on nexus, and so on.

Similarly with FIG. 14, these digital tax rules can be implemented or organized in different ways. In some use cases they can be organized with conditions and consequents, such as was described earlier in this document. Such conditions may relate to geographical boundaries, effective dates, and so on, for determining where and when a digital tax rule is to be applied. These conditions may be expressed as logical conditions with ranges, dates, other data, and so on. Values of the initial data can be iteratively tested against these logical conditions. In such cases, the consequents may indicate one or more tax obligations, such as to indicate different types of taxes that are due, rules, rates, exemption requirements, reporting requirements, remittance requirements, etc.

For example, a certain digital tax rule M_RULE6 may be identified and used. Identifying may be performed responsive to the values of the item query data 1436, which are considered for digital tax rules. For example, it can be recognized that a condition of the digital tax rule M_RULE6 is met by one or more of the values of the item query data 1436. For instance, it can be further determined that, at the time of the sale, the user 192 is located within the boundaries of a tax jurisdiction, that the host entity has nexus with that tax jurisdiction, and that there is no tax holiday.

As such, the computer system 1495 may produce the item digital rules 1437 which would apply to the possible buy-sell transaction, and include the item digital rules in a response, such as the response data 1435 of FIG. 14. The item digital rules 1437 can be produced by the computer system 1495 applying the certain digital tax rule M_RULE6. In this example, the consequent of the identified certain digital tax rule M_RULE6 may specify that a sales tax is due, the amount is to be determined by a multiplication of the sale price of the item by a specific rate, the tax return form that needs to be prepared and filed, a date by which it needs to be filed, the portion of the tax revenue spent by the domain on certain uses, and so on.

The computer system 1495 may then cause response data 1435 to be transmitted. The response data 1435 can include the item digital rules 1437, or information describing the item digital rules 1437. In this example, the response data 1435 is caused to be transmitted by the computer system 1495 as an answer to the received initial data 1433. The response data 1435 can be about an aspect of the item digital rules 1437. In particular, the response data 1435 may inform about the aspect of the item digital rules 1437, namely that it has been determined, where it can be found, what it is, at least a portion or a statistic of its content, how the tax amount obtained by the domain is used, the tax amount obtained by the domain, and so on.

The response data 1435 can be transmitted to the computing device 1420 from which the initial data 1433 was received. The computing device 1420 may convert the response data 1435 to resource information 1445, which is converted into display data 1451 and the aspect 1458, and displayed by using the display 1450. The aspect 1458 may appear on the display 1450, such as within a Graphical User Interface (GUI), by utilizing augmented reality, and so on. In this example a single response data 1435 encodes the entire item digital rules 1437, but that is not required, similarly with what is written above about encoding the item identity data 1425 within the initial data 1433. Of course, along with the item digital rules 1437, it is advantageous to embed in the response data 1435 information regarding the item 196 and possible buy-sell relationship. This will help the recipient correlate the response data 1435 to the initial data 1433, and therefore match the received resource information 1445 as the answer to the received item identity data 1425.

For such use cases, additional information obtained by embodiments may include: tax information for what one's shopping for doing the following: Product identified by the user through the augmented reality system can be identified as being exempt or not exempt; non-taxable items could be highlighted or suggested; products related to what the user is viewing could be suggested in the event a tax holiday provides a cheaper alternative; other products could be suggested or highlighted, or even verified that a specific held exemption certificate could be applied. If the viewed product is shown taxed, the system could show in the augmented reality interface what the percentage tax rate is, the amount of the tax, and the total cost with tax. The system could further show what jurisdictions receive the tax and what key categories are funded by the tax such as school districts, local governments, infrastructure improvements, etc. As such, a customer may select specifics funding categories they are most interested in. This data can be further used to suggest alternative product selections that better fit their funding categories. This provides a consumer way to make choices based on public funding priorities.

In the methods described above, each operation can be performed as an affirmative act or operation of doing, or causing to happen, what is written that can take place. Such doing or causing to happen can be by the whole system or device, or just one or more components of it. It will be recognized that the methods and the operations may be implemented in a number of ways, including using systems, devices and implementations described above. In addition, the order of operations is not constrained to what is shown, and different orders may be possible according to different embodiments. Examples of such alternate orderings may include overlapping, interleaved, interrupted, reordered, incremental, preparatory, supplemental, simultaneous, reverse, or other variant orderings, unless context dictates otherwise. Moreover, in certain embodiments, new operations may be added, or individual operations may be modified or deleted. The added operations can be, for example, from what is mentioned while primarily describing a different system, apparatus, device or method.

A person skilled in the art will be able to practice the present invention in view of this description, which is to be taken as a whole. Details have been included to provide a thorough understanding. In other instances, well-known aspects have not been described, in order to not obscure unnecessarily this description.

Some technologies or techniques described in this document may be known. Even then, however, it does not necessarily follow that it is known to apply such technologies or techniques as described in this document, or for the purposes described in this document.

This description includes one or more examples, but this fact does not limit how the invention may be practiced. Indeed, examples, instances, versions or embodiments of the invention may be practiced according to what is described, or yet differently, and also in conjunction with other present or future technologies. Other such embodiments include combinations and sub-combinations of features described herein, including for example, embodiments that are equivalent to the following: providing or applying a feature in a different order than in a described embodiment; extracting an individual feature from one embodiment and inserting such feature into another embodiment; removing one or more features from an embodiment; or both removing a feature from an embodiment and adding a feature extracted from another embodiment, while providing the features incorporated in such combinations and sub-combinations.

A number of embodiments are possible, each including various combinations of elements. When one or more of the appended drawings—which are part of this specification—are taken together, they may present some embodiments with their elements in a manner so compact that these embodiments can be surveyed quickly. This is true even if these elements are described individually extensively in this text, and these elements are only optional in other embodiments.

In general, the present disclosure reflects preferred embodiments of the invention. The attentive reader will note, however, that some aspects of the disclosed embodiments extend beyond the scope of the claims. To the respect that the disclosed embodiments indeed extend beyond the scope of the claims, the disclosed embodiments are to be considered supplementary background information and do not constitute definitions of the claimed invention.

In this document, the phrases "constructed to", "adapted to" and/or "configured to" denote one or more actual states of construction, adaptation and/or configuration that is fundamentally tied to physical characteristics of the element or feature preceding these phrases and, as such, reach well beyond merely describing an intended use. Any such elements or features can be implemented in a number of ways, as will be apparent to a person skilled in the art after reviewing the present disclosure, beyond any examples shown in this document.

Parent patent applications: Any and all parent, grandparent, great-grandparent, etc., patent applications, whether mentioned in this document or in an Application Data Sheet ("ADS") of this patent application, are hereby incorporated by reference herein as originally disclosed, including any priority claims made in those applications and any material incorporated by reference, to the extent such subject matter is not inconsistent herewith.

Reference numerals: In this description a single reference numeral may be used consistently to denote a single item, aspect, component, or process. Moreover, a further effort may have been made in the preparation of this description to use similar though not identical reference numerals to denote other versions or embodiments of an item, aspect, component or process that are identical or at least similar or related. Where made, such a further effort was not required, but was nevertheless made gratuitously so as to accelerate comprehension by the reader. Even where made in this document, such a further effort might not have been made completely consistently for all of the versions or embodiments that are made possible by this description. Accordingly, the description controls in defining an item, aspect, component or process, rather than its reference numeral. Any similarity in reference numerals may be used to infer a similarity in the text, but not to confuse aspects where the text or other context indicates otherwise.

The claims of this document define certain combinations and sub-combinations of elements, features and acts or operations, which are regarded as novel and non-obvious. The claims also include elements, features and acts or operations that are equivalent to what is explicitly mentioned. Additional claims for other such combinations and sub-combinations may be presented in this or a related document. These claims are intended to encompass within their scope all changes and modifications that are within the true spirit and scope of the subject matter described herein. The terms used herein, including in the claims, are generally intended as "open" terms. For example, the term "including" should be interpreted as "including but not limited to," the term "having" should be interpreted as "having at least," etc. If a specific number is ascribed to a claim recitation, this number is a minimum but not a maximum unless stated otherwise. For example, where a claim recites "a" component or "an" item, it means that the claim can have one or more of this component or this item.

In construing the claims of this document, 35 U.S.C. § 112(f) is invoked by the inventor(s) only when the words "means for" or "steps for" are expressly used in the claims. Accordingly, if these words are not used in a claim, then that claim is not intended to be construed by the inventor(s) in accordance with 35 U.S.C. § 112(f).

What is claimed is:

1. A system for use by a person, the system including at least:
   a display configured to be visible by the person;
   a sensor configured to be carried by the person when the person is located within line of sight of an item that is tangible, physical, and capable of being an object of a potential relationship instance, the sensor being used for sensing the item;

one or more processors coupled to the display and to the sensor; and one or more non-transitory computer-readable storage media coupled to the one or more processors having stored thereon instructions which, when executed by the one or more processors, result in operations including at least:

generating item identity data that identifies the item based on data acquired by the sensor;

transmitting, across a network by the one or more processors, a request with initial data, the initial data derived at least in part from the item identity data;

receiving, across the network and in response to the request, a response based on the initial data, the response including resource information about the potential relationship instance; and in response to the receiving the resource information, displaying, on the display, display data derived from the resource information and indicating an aspect of the potential relationship instance.

2. The system of claim 1, in which:
the one or more processors and the one or more non-transitory computer-readable storage media are part of a personal computing device configured to be carried by the person.

3. The system of claim 1, in which:
the system further includes a housing; and
the sensor and the display are attached to the housing.

4. The system of claim 1, in which:
the sensor is a part of a camera; and
the identity data is based on image data.

5. The system of claim 4, in which:
the display data further includes an image of at least a portion of the item that is made from the image data.

6. The system of claim 5, further including:
a Learning Functionality, and in which:
the image data does not include a machine readable-optical code; and
generating the item identity data includes using the Learning Functionality to identify the item based on the image data.

7. The system of claim 5, in which:
the indicated aspect of the resource information is superimposed on the image of at least a portion of the physical item.

8. The system of claim 7, in which:
the superimposition is performed via augmented reality.

9. The system of claim 1, in which:
the system further includes a pair of glasses configured to be worn by the person; and
the display is a heads-up display based on the glasses.

10. The system of claim 1, in which:
the initial data includes the item identity data.

11. The system of claim 1, in which:
the operations further include obtaining, by the one or more processors, information regarding an entity offering the item; and
the initial data includes the information regarding the entity offering the item.

12. The system of claim 1, in which the operations further include:
obtaining location data associated with one or more of: the system, the item, and an entity having the item, in which the location data identifies a current geographic location associated with one or more of: the system, the item, and the entity having the item;
the initial data includes the location data; and
the resource information is produced based on item digital rules obtained from a digital rules database queried by using item query data and the location data, the item query data being produced by an item query database based on the item identity data.

13. The system of claim 12, in which the resource information is produced by applying the item digital rules to the potential relationship instance based on the item identity data and the location data.

14. The system of claim 13, in which the location data indicates a current location of the system.

15. The system of claim 1, in which the resource information includes a percentage tax rate.

16. The system of claim 1, in which:
the resource information includes data describing a resource amount to be remitted to a domain as a result of the potential relationship instance, the resource amount being associated with the potential relationship instance involving the item.

17. The system of claim 16, in which:
the item identity data is generated via identifying a product code;
the operations further include looking up, from the product code, a base value; and
the request includes the base value.

18. The system of claim 17, in which:
the one or more non-transitory computer-readable storage media store a list of product codes and base values; and
the base value is looked up from the list.

19. The system of claim 17, in which the operations further include:
communicating, along a communication link, the product code to a system of a host premises; and
receiving the base value, via the communication link in response.

20. The system of claim 16, in which:
the resource information further includes data describing how at least a portion of the resource amount is to be used by the domain.

21. The system of claim 20, in which the operations further include:
obtaining input identifying one or more resource use priorities;
in response to obtaining the input identifying the one or more resource use priorities, determining whether the resource amount is to be used for at least one of the one or more resource use priorities based on the data describing how at least a portion of the resource amount is to be used by the domain; and
displaying on the display that the resource amount is to be used for at least one of the one or more resource use priorities based on a determination that at least a portion of the resource amount is to be used for at least one of the one or more resource use priorities.

22. The system of claim 16, in which the operations further include:
identifying a second item which is determined to be similar to the item based on the item identity data;
in response to identifying the second item, displaying second resource information associated with a second potential relationship instance involving the second item, the second resource information including a second resource amount associated with the second potential relationship instance involving the second item;

determining whether the second resource amount is less than the resource amount, and displaying on the display that the second resource amount for the second item is less than the resource amount for the item based on a determination that the second resource amount is less than the resource amount.

23. The system of claim 1, in which generating the item identity data includes:

generating an image of at least a portion of the item, and in which the item identity data is generated based on identifying the item in the image based on one or more of: object recognition performed by image processing of the image; reading an item identification code present in the image; recognizing text in the image indicating a name or brand of the item; and recognizing a trademark in the image.

24. The system of claim 23, in which:

the image is an image of a screen displaying an image of at least a portion of the item.

* * * * *